United States Patent
Choi et al.

(10) Patent No.: US 10,680,664 B2
(45) Date of Patent: Jun. 9, 2020

(54) DEVICE AND METHOD FOR COMPENSATING NONLINEARITY OF A TRANSMITTER

(71) Applicant: SAMSUNG ELECTRONICS CO., LTD., Suwon-si, Gyeonggi-do (KR)

(72) Inventors: Hong-min Choi, Seoul (KR); Dae-young Kim, Yongin-si (KR); Joo-hyun Do, Seoul (KR); Young-ik Cho, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 16/232,187

(22) Filed: Dec. 26, 2018

(65) Prior Publication Data

US 2019/0393908 A1   Dec. 26, 2019

(30) Foreign Application Priority Data

Jun. 20, 2018   (KR) .................. 10-2018-0070822

(51) Int. Cl.
    *H04B 1/04*    (2006.01)
    *H04B 1/00*    (2006.01)

(52) U.S. Cl.
    CPC ....... *H04B 1/04* (2013.01); *H04B 2001/0425* (2013.01)

(58) Field of Classification Search
    CPC ........ H04B 1/006; H04B 1/04; H04B 1/0475; H04B 1/0483; H04B 1/40; H04B 1/62; H04B 1/525; H04B 7/0413; H04B 7/0417; H04B 7/0617; H04B 10/2507; H04B 10/50572; H04B 10/50593; H04B 10/58; H04B 17/13; H04B 2011/0425; H04B 2001/0433

USPC ..... 455/63.1, 67.13, 69, 114.1, 114.2, 114.3; 375/296, 297

See application file for complete search history.

(56) References Cited

U.S. PATENT DOCUMENTS

| 8,014,467 | B2* | 9/2011 | Behzad | ............. H04L 25/03343 |
| | | | | 375/296 |
| 8,280,312 | B2 | 10/2012 | Boe et al. | |
| 8,344,800 | B2* | 1/2013 | Baik | .................. H04B 7/15585 |
| | | | | 455/63.1 |

(Continued)

FOREIGN PATENT DOCUMENTS

| KR | 10-2013-0074085 | 7/2013 |
| WO | 2016-167145 | 4/2017 |

OTHER PUBLICATIONS

C. Eun, et al., "A New Volterra Predistorter Based on the Indirect Learning Architecture", IEEE Trans. Signal Processing, vol. 45, No. 1, pp. 223-227, Jan. 1997.

(Continued)

*Primary Examiner* — Quochien B Vuong
(74) *Attorney, Agent, or Firm* — F. Chau & Associates, LLC

(57) ABSTRACT

A communication device including: a transmitter for providing a first radio frequency (RF) signal to a first antenna; a second antenna for receiving the first RF signal from the first antenna to produce a second RF signal; a receiver for receiving the second RF signal from the second antenna, wherein the receiver generates a feedback signal from the second RF signal; and a controller configured to control pre-distortion based on the feedback signal.

18 Claims, 16 Drawing Sheets

(56) References Cited

U.S. PATENT DOCUMENTS

| | | | |
|---|---|---|---|
| 8,477,871 B2 | 7/2013 | Neumann et al. | |
| 8,498,590 B1 | 7/2013 | Rashev et al. | |
| 8,625,698 B2* | 1/2014 | Ko | H04B 7/0486 |
| | | | 375/296 |
| 8,811,518 B2* | 8/2014 | Li | H04B 7/0447 |
| | | | 375/296 |
| 8,982,995 B1* | 3/2015 | Van Cai | H04B 1/0475 |
| | | | 375/297 |
| 9,065,396 B2 | 6/2015 | Son et al. | |
| 9,450,623 B2* | 9/2016 | Weissman | H04B 1/10 |
| 9,525,205 B2* | 12/2016 | Oh | H01Q 3/38 |
| 9,762,302 B1* | 9/2017 | Shaked | H04B 7/0456 |
| 9,813,085 B1* | 11/2017 | Butler | H04B 1/0458 |
| 10,333,567 B1* | 6/2019 | Luo | H04L 5/0091 |
| 10,404,267 B2* | 9/2019 | Maehata | H04B 1/52 |
| 2017/0047965 A1 | 2/2017 | Shaked | |
| 2018/0053997 A1 | 2/2018 | Noto et al. | |
| 2018/0294564 A1* | 10/2018 | Kim | G01S 7/4052 |

OTHER PUBLICATIONS

L. Ding, et al., "A Robust Digital Baseband Predistorter Constructed Using Memory Polynomials", IEEE Transactions on Communications, vol. 52, No. 1, Jan. 2004, pp. 159-165.

\* cited by examiner

DEVICE AND METHOD FOR COMPENSATING NONLINEARITY OF A TRANSMITTER

CROSS-REFERENCE TO RELATED APPLICATION

This application claims priority under 35 U.S.C. § 119 to Korean Patent Application No. 10-2018-0070822, filed on Jun. 20, 2018, in the Korean Intellectual Property Office, the disclosure of which is incorporated by reference herein in its entirety.

TECHNICAL FIELD

The inventive concept relates to wireless communications and, more particularly, to a device and method for compensating nonlinearity of a transmitter.

DISCUSSION OF RELATED ART

A wireless communication device may include a transmitter to provide a radio-frequency (RF)-band signal to an antenna. The transmitter may include components (e.g., a filter, a power amplifier, and a mixer) to generate the RF-band signal from a baseband signal. When processing the baseband signal, the RF-band signal may be distorted due to characteristics of the transistor's components. For example, the transmitter may have nonlinearity between the baseband signal and the RF-band signal, thereby distorting the RF-band signal and causing interference in wireless communications. In particular, when there is an increase in frequency (or a carrier frequency) of the RF-band signal and a plurality of antennas (or an antenna array) is employed, the distortion of the RF-band signal due to the nonlinearity of the transmitter may worsen. Therefore, the nonlinearity of the transmitter may not be effectively compensated.

SUMMARY

According to an exemplary embodiment of the inventive concept, there is provided a communication device including: a transmitter for providing a first radio frequency (RF) signal to a first antenna; a second antenna for receiving the first RF signal from the first antenna to produce a second RF signal; a receiver for receiving the second RF signal from the second antenna, wherein the receiver generates a feedback signal from the second RF signal; and a controller configured to control pre-distortion based on the feedback signal.

According to an exemplary embodiment of the inventive concept, there is provided a communication system including: a first device including a transmitter for outputting a first RF signal through a first antenna; and a second device including a second antenna for receiving the first RF signal to produce a second RF signal, a receiver for receiving the second RF signal from the second antenna, and a feedback generator for generating a feedback signal from the second RF signal, wherein the first device further includes a controller configured to control pre-distortion in response to the feedback signal provided from the second device.

According to an exemplary embodiment of the inventive concept, there is provided a method for compensating nonlinearity of a transmitter, the method including: generating, at a pre-distorter of a communication device, a baseband signal; generating, at a transmitter of the communication device, a first RF signal from the baseband signal, and transmitting the first RF signal through a first antenna of the communication device; receiving the first RF signal through a second antenna of the communication device to produce a second RF signal, and generating, at a receiver of the communication device, a feedback signal from the second RF signal; and compensating nonlinearity of the transmitter based on the feedback signal.

According to an exemplary embodiment of the inventive concept, there is provided a method for compensating distortion of a transmitter, the method including: generating a first baseband signal at a pre-distorter of a first device; generating, at a transmitter of the first device, a first RF signal from the baseband signal, and transmitting the first RF signal through a first antenna of the first device; receiving, at a second antenna of a second device, the first RF signal to produce a second RF signal; generating, at the second device, a feedback signal from the second RF signal; providing the feedback signal from the second device to the first device; and compensating distortion of the transmitter based on the feedback signal.

According to an exemplary embodiment of the inventive concept, there is provided a communication device including: a pre-distorter configured to generate a first baseband signal; a transmitter configured to generate a first RF signal from the first baseband signal; a first antenna configured to output the first RF signal; a second antenna configured to receive the first RF signal and output a second RF signal corresponding to the first RF signal; a receiver configured to generate a feedback signal from the second RF signal; and a controller configured to receive the feedback signal and estimate distortions of the transmitter based on the feedback signal.

BRIEF DESCRIPTION OF THE DRAWINGS

The above and other features of the inventive concept will be more clearly understood by describing in detail exemplary embodiments thereof with reference to the accompanying drawings in which.

DETAILED DESCRIPTION OF THE EMBODIMENTS

Figure 1:
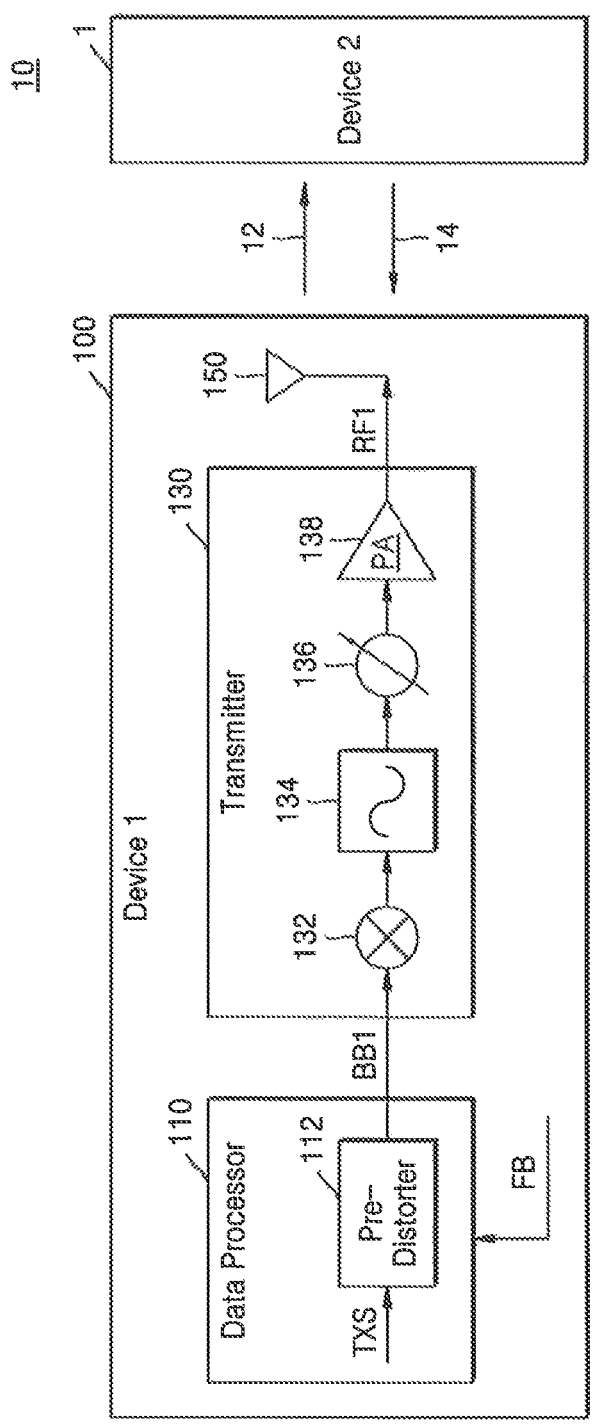
FIG. 1 is a block diagram of a wireless communication system including a wireless communication device according to an exemplary embodiment of the inventive concept.

FIG. 1 is a block diagram of a wireless communication system 10 including a wireless communication device according to an exemplary embodiment of the inventive concept. The wireless communication system 10 may be, but is not limited to, a wireless communication system using a cellular network (e.g., a $5^{th}$ generation (5G) wireless system, a long-term evolution (LTE) system, an LTE-advanced system, a code division multiple access (CDMA) system, or a global system for mobile communications (GSM) system), a wireless local area network (WLAN), WiFi, Bluetooth, or any other wireless communication system. Hereinafter, the wireless communication system 10 will mainly be described with reference to a wireless communication system using a cellular network, but it is to be understood that the following exemplary embodiments are not limited thereto.

A first device 100 and a second device 1 may each be any type of device capable of transmitting and receiving signals via wireless communications. Each of the first device 100 and the second device 1 may be referred to as a communication device or a wireless communication device. In exemplary embodiments of the inventive concept, the first device 100 may be a base station, and the second device 1 may be user equipment. In exemplary embodiments of the inventive concept, the first device 100 may be user equipment, and the second device 1 may be a base station. The base station may be a fixed station configured to communicate with user equipment and/or another base station. The base station may communicate with the user equipment and/or another base station and exchange data and control information. For example, the base station may be referred to as Node B, an evolved-Node B (eNB), a sector, a site, a base transceiver system (BTS), an access pint (AP), a relay node, a remote radio head (RRH), a radio unit (RU), or a small cell. The user equipment may be fixed or have mobility and refer to various pieces of equipment capable of communicating with the base station and transceiving data and/or control information. For example, the user equipment may be terminal equipment, a mobile station (MS), a mobile terminal (MT), a user terminal (UT), a subscribe station (SS), a wireless device, or a handheld device. A wireless communication network between the user equipment and the base station may support the communication of a plurality of users with each other by sharing available network resources. For example, in the wireless communication network, information may be transmitted using various multiple access methods, such as code division multiple access (CDMA), frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA.

Referring to FIG. 1, the first device 100 may include a data processor 110, a transmitter 130, and an antenna 150. The data processor 110 may generate a first baseband signal BB1 and provide the first baseband signal BB1 to the transmitter 130. The transmitter 130 may process the first baseband signal BB1, generate a first radio frequency (RF) signal RF1, and provide the first RF signal RF1 to the antenna 150. As used herein, the antenna 150, which is configured to transmit the first RF signal RF1, may be referred to as a first antenna. The second device 1 may receive a first signal 12 from the first device 100. The second device 1 may include an antenna and transmit a second signal 14 to the first device 100 through the antenna. The first device 100 may further include a receiver configured to receive the second signal 14. In exemplary embodiments of the inventive concept, the transmitter 130 and the receiver may be implemented as a transceiver in one block.

The transmitter 130 may include components configured to process the first baseband signal BB1. For example, as shown in FIG. 1, the transmitter 130 may include a mixer 132, a filter 134, a phase shifter 136, and a power amplifier 138. In exemplary embodiments of the inventive concept, the transmitter 130 may include only some of the components of FIG. 1. In exemplary embodiments of the inventive concept, the transmitter 130 may further include additional components, which are not shown in FIG. 1. In exemplary embodiments of the inventive concept, the mixer 132, the filter 134, the phase shifter 136, and the power amplifier 138 may process the first baseband signal BB1 in a different order than shown in FIG. 1.

The transmitter 130 may have nonlinearity due to characteristics of its components. For example, the power amplifier 138 may have a nonlinear gain, and the nonlinear gain of the power amplifier 138 may contribute to the nonlinearity of the transmitter 130. Pre-distortion may be used to compensate the nonlinearity of the transmitter 130. The pre-distortion may refer to a method of pre-distorting an input (e.g., the first baseband signal BB1) of the transmitter 130, based on nonlinearity that is opposite to the nonlinearity of the transmitter 130. The nonlinearity of the transmitter 130 may be compensated due to the pre-distortion, and a desirable first RF signal RF1 may be provided to the antenna 150. As described above, the nonlinearity of the transmitter 130 may be determined by a plurality of components included in the transmitter 130. When the transmitter 130 is an integrated circuit (IC), the nonlinearity of the transmitter 130 may be changed due to a process, voltage and temperature (PVT) variation. Thus, to precisely compensate the nonlinearity of the transmitter 130, pre-distortion may be performed based on a feedback generated from an output of the transmitter 130.

To generate the feedback from the output of the transmitter 130, a unit (e.g., a coupler, a port, or a test point) configured to obtain the output of the transmitter 130 may be located between the transmitter 130 and the antenna 150. However, a short-wavelength signal (e.g., a millimeter wave) may be sensitive to the unit. As a result, the reliability of wireless transmission may be reduced by distorting the first RF signal RF1. As described below with reference to FIG. 3, the first device 100 may include a plurality of antennas or a plurality of first antennas to realize beam forming or multi-input and multi-output (MIMO). The transmitter 130 may include components (e.g., a plurality of phase shifters and a plurality of power amplifiers) respectively corresponding to the plurality of antennas. Neither obtaining feedbacks from all of a plurality of paths corresponding to the plurality of antennas, nor individually pre-distorting each of the plurality of paths is efficiently accomplished. However, as described below, according to an exemplary embodiment of the inventive concept, a feedback may be generated based on a signal output by the antenna 150 in response to the first RF signal RF1 to perform pre-distortion easily and precisely.

The data processor 110 may include a pre-distorter 112, and the pre-distorter 112 may pre-distort a transmission signal TXS and generate the first baseband signal BB1. In exemplary embodiments of the inventive concept, the transmission signal TXS may be a digital signal, and the pre-distorter 112 may be a digital pre-distorter (DPD), which may generate a distorted digital signal from the transmission signal TXS. The data processor 110 may include a digital-to-analog converter (DAC), which may convert the digital signal output by the pre-distorter 112 and output the first baseband signal BB1. In exemplary embodiments of the inventive concept, the transmission signal TXS may be an analog signal, and the pre-distorter 112 may be an analog pre-distorter. Herein, it is assumed that the pre-distorter 112 is a digital pre-distorter, the illustration of the DAC included in the data processor 110 is omitted for brevity, and the pre-distorter 112 may generate the first baseband signal BB1. In exemplary embodiments of the inventive concept, the pre-distorter 112 serving as the digital pre-distorter may include at least one of a hardware block designed by logic synthesis and a software block including a series of instructions. In exemplary embodiments of the inventive concept, the data processor 110 may be a modem.

The data processor 110 may receive a feedback FB based on the output of the transmitter 130, and perform pre-distortion based on the feedback FB. The feedback FB may be generated based on the first RF signal RF1 transmitted through the antenna 150. In exemplary embodiments of the inventive concept, as described below with reference to FIGS. 2 to 8, the feedback FB may be generated based on an RF signal, which is received through another antenna (e.g., 290 in FIG. 2) included in the first device 100. In exemplary embodiments of the inventive concept, as described below with reference to FIGS. 9 to 12, a feedback FB may be generated by a device (e.g., 90 in FIG. 9) other than the first device 100. Thus, nonlinearity of the transmitter 130 may be precisely compensated, and reliability of wireless communications may be increased. Even in wireless communications using an antenna array including a plurality of antennas, nonlinearity of the transmitter 130 may be compensated precisely and efficiently. In addition, a component configured to provide a feedback for pre-distortion between the transmitter 130 and the antenna 150 may be omitted so that distortion caused by the feedback may be removed from wireless communications using short wavelengths.

Figure 2:
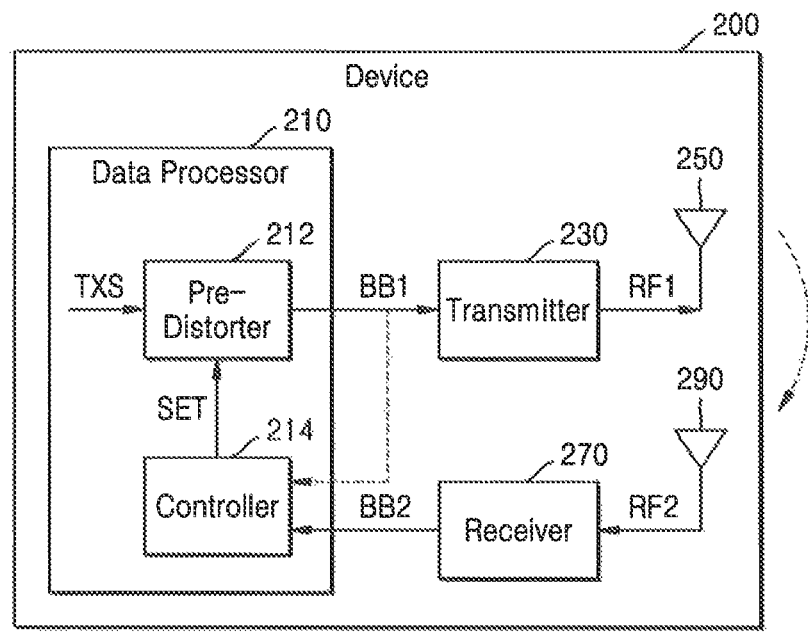
FIG. 2 is a block diagram of a device according to an exemplary embodiment of the inventive concept.

FIG. 2 is a block diagram of a device 200 according to an exemplary embodiment of the inventive concept. For example, FIG. 2 illustrates the device 200 configured to generate a feedback for pre-distortion based on an RF signal received through an antenna included therein. A second baseband signal BB2 of FIG. 2 may function as the feedback FB of FIG. 1. As shown in FIG. 2, the device 200 may include a data processor 210, a transmitter 230, a first antenna 250, a receiver 270, and a second antenna 290.

As described above with reference to FIG. 1, the data processor 210 may provide a first baseband signal BB1 to the transmitter 230, and the transmitter 230 may generate a first RF signal RF1 from the first baseband signal BB1 and provide the first RF signal RF1 to the first antenna 250. The receiver 270 may receive a second RF signal RF2, which is caused by the first RF signal RF1, through the second antenna 290, generate a second baseband signal BB2 from the second RF signal RF2, and provide the second baseband signal BB2 to the data processor 210. In exemplary embodiments of the inventive concept, the first antenna 250 may be a transmission antenna and the second antenna 290 may be a receiving antenna of the same wireless communication system (e.g., 5G, LTE, and the like). In exemplary embodiments of the inventive concept, the first antenna 250 may support a wireless communication system using a cellular network, while the second antenna 290 may support a different wireless communication system, such as WLAN. In exemplary embodiments of the inventive concept, the second antenna 290 may be a dedicated receiving antenna for pre-distortion.

The data processor 210 may include a pre-distorter 212 and a controller 214. The pre-distorter 212 may distort a transmission signal TXS and generate a first baseband signal BB1. In exemplary embodiments of the inventive concept, the pre-distorter 212 may include at least one lookup table, and generate the first baseband signal BB1 based on the output of at least one lookup table corresponding to the transmission signal TXS. In exemplary embodiments of the inventive concept, the pre-distorter 212 may include at least one calculator configured to calculate a polynomial expression including the transmission signal TXS and at least one coefficient, and the pre-distorter 212 may generate the first baseband signal BB1 based on an output of the at least one calculator.

The pre-distorter 212 may perform pre-distortion using a number of methods. For example, the pre-distorter 212 may perform pre-distortion according to indirect learning, which has been described in C. Eun and E. J. Powers, "A new Volterra predistorter based on the indirect learning architecture," IEEE Trans. Signal Processing, vol. 45, pp. 223-227, January 1997. The pre-distorter 212 may also perform pre-distortion according to the techniques described in D. Lei, Zhou, Tong, "A Robust Digital Baseband Predistorter Constructed Using Memory Polynomials," IEEE Transactions on Communications, Vol. 52, No. 1, January 2004. The disclosures of these papers are incorporated by reference herein in their entireties. When a sample of the transmission signal TXS, which is an input of the pre-distorter 212, is x(n) and a sample of the first baseband signal BB1, which is an output of the pre-distorter 212, is y(n) (1≤n≤N, N is a positive integer), the pre-distorter 212 may be modelled by a polynomial expression as in Equation 1:

$$y(n) = \Sigma_{k=0}^{p} a_k x(n) |x(n)|^k \quad (1),$$

wherein p denotes an order of the polynomial expression. When N samples are provided, the pre-distorter 212 may be modelled as in Equation 2:

$$Y_N = \quad (2)$$

-continued $$XA = \begin{bmatrix} x(N) \, x(N)|x(N)| \ldots x(N)|x(N)|^P \\ x(N-1) \, x(N-1)|x(N-1)| \ldots x(N-1)|x(N-1)|^P \\ \vdots \\ x(1) \, x(1)|x(1)| \ldots x(1)|x(1)|^P \end{bmatrix} \begin{bmatrix} a_0 \\ a_1 \\ \vdots \\ a_P \end{bmatrix}.$$

A of Equation 2 may be calculated using a least square as in Equation 3:

$$\hat{A} = (X^T X)^{-1} X^T Y_N \quad (3).$$

Figure 3:
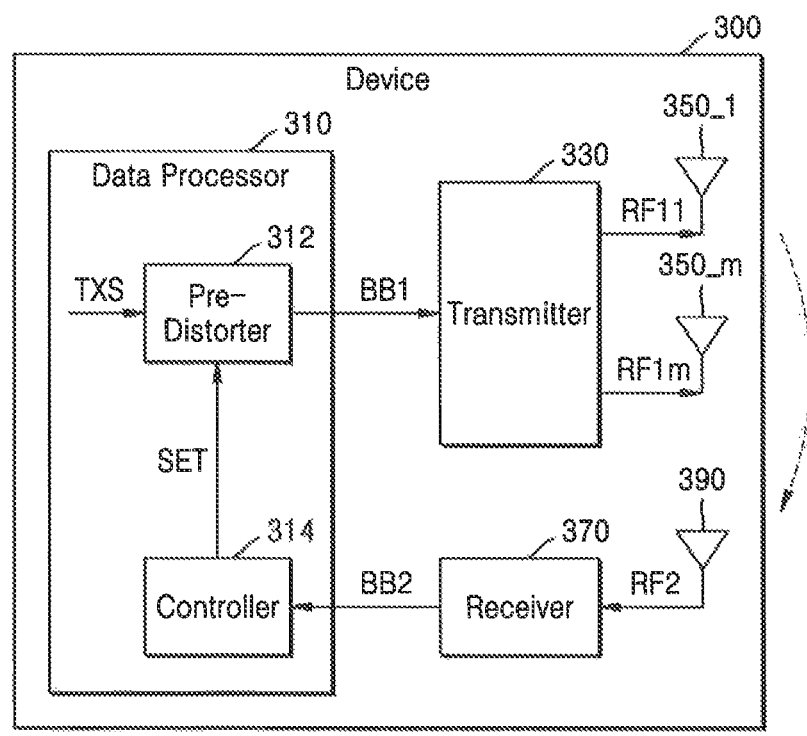
FIG. 3 is a block diagram of a device according to an exemplary embodiment of the inventive concept.

The controller 214 may control the pre-distorter 212 based on the second baseband signal BB2 received from the receiver 270. In exemplary embodiments of the inventive concept, the controller 214 may control the pre-distorter 212 to generate the predefined first baseband signal BB1 irrespective of the transmission signal TXS, and estimate nonlinearity of the transmitter 230 based on the second baseband signal BB2 corresponding to the first baseband signal BB1. In exemplary embodiments of the inventive concept, the controller 214 may receive the first baseband signal BB1, and estimate nonlinearity of the transmitter 230 based on the first baseband signal BB1 and the second baseband signal BB2. Although FIGS. 3 and 5 to 8 illustrate a case in which a controller of a data processor receives only the second baseband signal BB2, it should be noted that the controller may receive the first baseband signal BB1 (as indicated by the dashed line in FIG. 2). Although FIG. 3 illustrates a case in which the controller 314 directly receives the second baseband signal BB2, the data processor 310 may include an analog-to-digital converter (ADC). In this case, when the second baseband signal BB2 in analog form is transmitted from the receiver 370, the ADC may convert the second baseband signal BB2 into a digital signal so that the controller 314 may receive the digital signal.

In a pre-distortion set mode, the controller 214 may set pre-distortion of the pre-distorter 212, based on the second baseband signal BB2. In exemplary embodiments of the inventive concept, the controller 214 may set at least one parameter for defining an operation of the pre-distorter 212 based on a set signal SET, and the pre-distorter 212 may perform pre-distortion based on the at least one parameter. For example, the controller 214 may obtain Â of Equation 3 based on the second baseband signal BB2 and generate a set signal SET based on Â. When the controller 214 completes setting the pre-distortion of the pre-distorter 212, the controller 214 may leave the pre-distortion set mode. In a wireless communication mode, the pre-distorter 212 may distort the transmission signal TXS according to the setting of the controller 214 and generate the first baseband signal BB1.

FIG. 3 is a block diagram of a device 300 according to an exemplary embodiment of the inventive concept. For example, FIG. 3 illustrates the device 300 configured to transmit a signal through an antenna array. Similar to FIG. 2, a second baseband signal BB2 of FIG. 3 may function as the feedback FB of FIG. 1. As shown in FIG. 3, the device 300 may include a data processor 310, a transmitter 330, a plurality of first antennas 350_1 to 350_m, a receiver 370, and a second antenna 390 (m is an integer larger than 1).

The data processor 310 may provide a first baseband signal BB1 to the transmitter 330, and the transmitter 330 may generate a plurality of first RF signals RF11 to RF1m corresponding to the plurality of first antennas 350_1 to 350_m in response to the first baseband signal BB1. For example, the transmitter 330 may include m power amplifiers corresponding to the plurality of first RF signals RF11 to RF1m. The plurality of first antennas 350_1 to 350_m may be referred to as an antenna array and used for beam forming or MIMO. As shown in FIG. 3, the compensation of nonlinearity of the transmitter 330 configured to generate the plurality of first RF signals RF11 to RF1m may involve generating the first baseband signal BB1, which is pre-distorted using a single pre-distorter 312, instead of compensating each of m paths corresponding to the plurality of first RF signals RF11 to RF1m. As described below with reference to FIGS. 4A and 4B, experimental data show that the use of the single pre-distorter 312 is effective in compensating the nonlinearity of the transmitter 330 for the antenna array.

The receiver 370 may receive a second RF signal RF2, which is caused by at least one of the plurality of first RF signals RF11 to RF1m, from the second antenna 390. The receiver 370 may generate the second baseband signal BB2 from the second RF signal RF2 and provide the second baseband signal BB2 to the data processor 310. The controller 314 of the data processor 310 may generate a set signal SET based on the second baseband signal BB2 and set at least one parameter of the pre-distorter 312 via the set signal SET. The pre-distorter 312 may distort a transmission signal TXS based on the at least one parameter and generate the first baseband signal BB1.

Figure 4A:
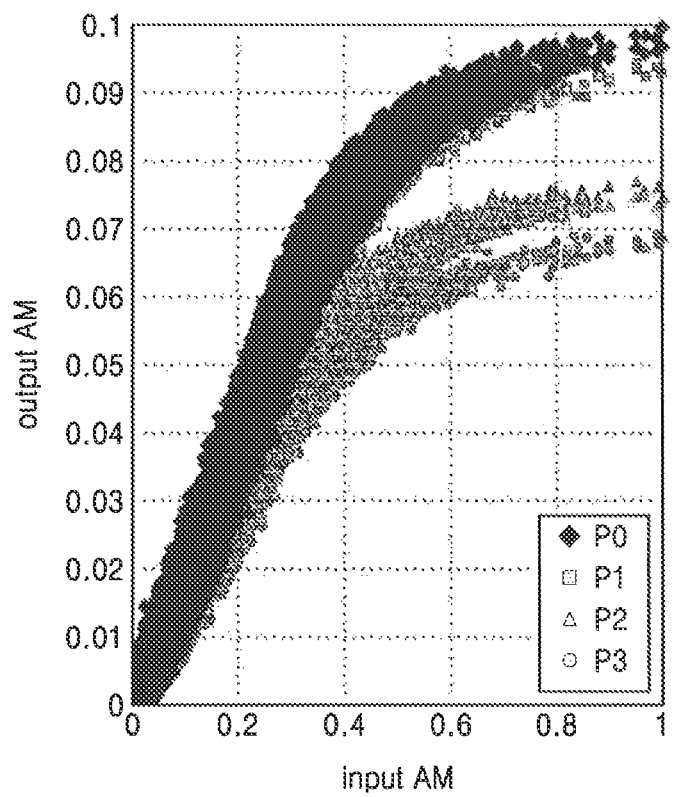
FIGS. 4A and 4B are graphs of data obtained by conducting experiments on an antenna array including four antennas and a transmitter according to exemplary embodiments of the inventive concept.
Figure 4B:
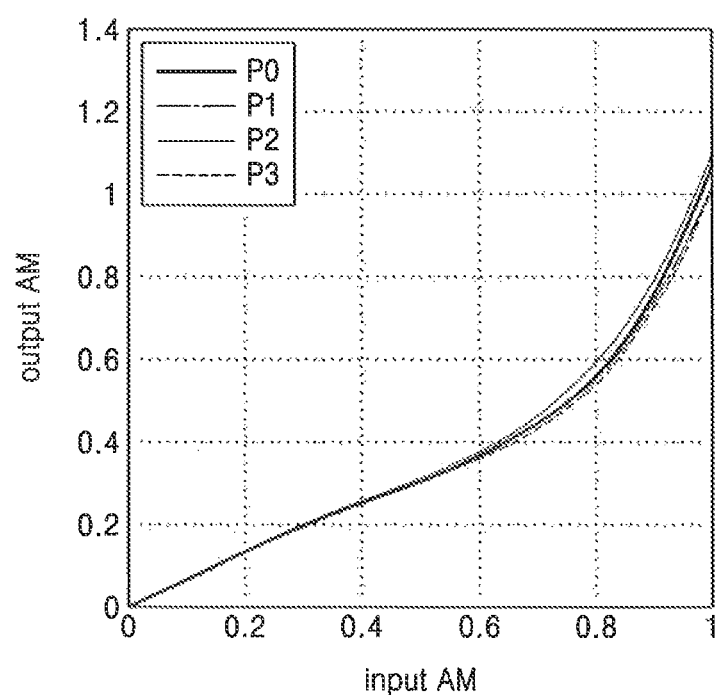

FIGS. 4A and 4B are graphs of data obtained by conducting experiments on an antenna array including four antennas P0, P1, P2 and P3 and a transmitter according to exemplary embodiments of the inventive concept. For example, FIG. 4A shows an amplitude ratio between an input (e.g., BB1 in FIG. 3) of the transmitter and a feedback (e.g., BB2 in FIG. 3), and FIG. 4B shows an amplitude ratio between an input (e.g., TXS in FIG. 3) of a pre-distorter set based on a feedback and an output (e.g., BB1 in FIG. 3). Hereinafter, FIGS. 4A and 4B will be described with reference to FIG. 3.

Referring to FIG. 4A, signals fed back from four respective antennas P0, P1, P2 and P3 may provide different amplitude ratios due to different antenna gains of the four antennas P0, P1, P2 and P3. However, referring to FIG. 4B, pre-distortion characteristics derived by considering differences between the antenna gains may be approximately equal. In other words, a plurality of first RF signals RF11 to RF1m generated by the transmitter 330 for an antenna array may experience approximately the same nonlinearity of the transmitter 330. Thus, as described above with reference to FIG. 3, nonlinearity of the transmitter 330 configured to generate the plurality of first RF signals RF11 to RF1m may be effectively compensated by using a single pre-distorter 312.

Figure 5:
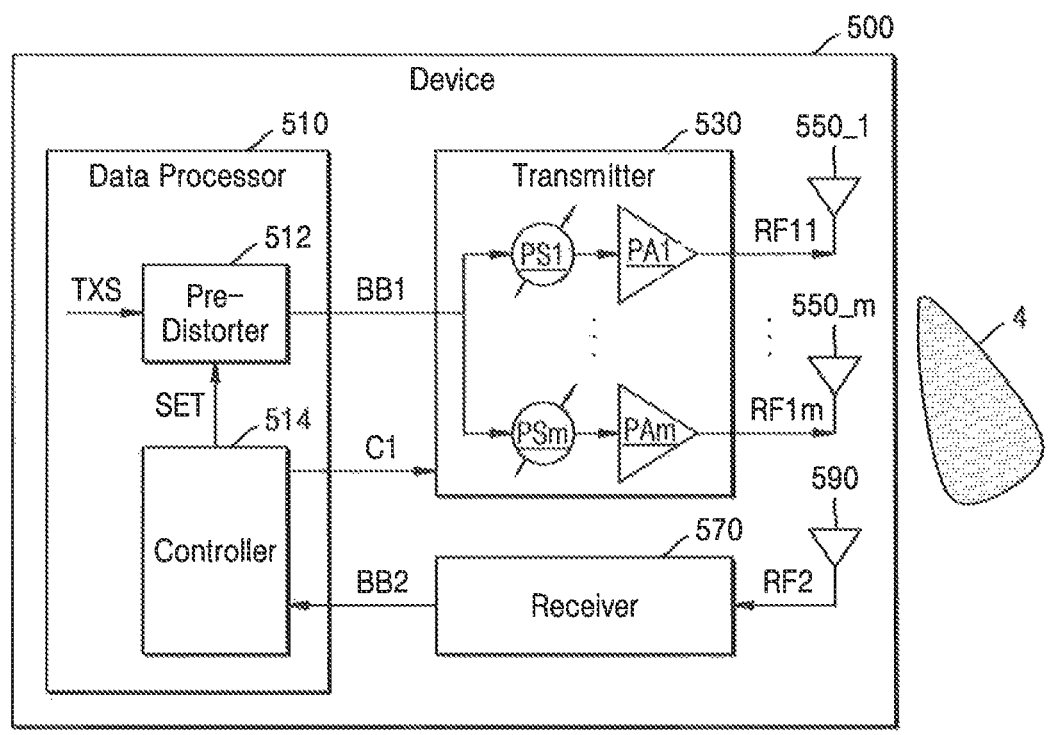
FIG. 5 is a block diagram of a device according to an exemplary embodiment of the inventive concept.

FIG. 5 is a block diagram of a device 500 according to an exemplary embodiment of the inventive concept. For example, FIG. 5 illustrates the device 500 configured to transmit signals through an antenna array configured to form a beam. Similar to FIG. 2, a second baseband signal BB2 of FIG. 5 may function as the feedback FB of FIG. 1. As shown in FIG. 5, the device 500 may include a data processor 510, a transmitter 530, a plurality of first antennas 550_1 to 550_m, a receiver 570, and a second antenna 590.

The data processor 510 may provide a first baseband signal BB1 to the transmitter 530, and the transmitter 530 may generate a plurality of first RF signals RF11 to RF1m corresponding to the plurality of first antennas 550_1 to 550_m in response to the first baseband signal BB1. The transmitter 530 may include a plurality of phase shifters PS1 to PSm and a plurality of power amplifiers PA1 to PAm, which correspond to the plurality of first RF signals RF11 to RF1*m*. The plurality of first RF signals RF11 to RF1*m* may have phases that are shifted by the plurality of phase shifters PS1 to PSm. Thus, the plurality of first antennas 550_1 to 550_*m* may form a beam 4.

In a pre-distortion set mode, the controller 514 may control the plurality of phase shifters PS1 to PSm such that the beam 4 formed by the plurality of first antennas 550_1 to 550_*m* is oriented toward the second antenna 590. For example, as shown in FIG. 5, the controller 514 may provide a first control signal C1 for controlling the plurality of phase shifters PS1 to PSm to the transmitter 530. In an i-th RF signal (1≤i≤m), it is assumed that a gain of an i-th antenna is $G_i$, a phase shift caused by an i-th phase shifter is $shifter_i$, a phase shift caused in a path including internal paths of the transmitter 530, paths between the transmitter 530 and the plurality of first antennas 550_1 to 550_*m*, a wireless channel, and the like is $path_i$, a nonlinear function of an i-th power amplifier is $PA_i$, and a nonlinear function caused by the pre-distorter 512 is PD. When the influence of the second antenna 590 and the receiver 570 is neglected, the second baseband signal BB2 may be expressed as in Equation 4:

$$BB2 = \sum_{i=1}^{m} G_n \cdot \exp(j \cdot (shifter_i + path_i)) \cdot PA_i(PD(TXS)) \quad (4).$$

In exemplary embodiments of the inventive concept, when the controller 514 controls the plurality of phase shifters PS1 to PSm to form the beam 4 toward the second antenna 590, a value of ($shifter_i + path_i$) in Equation 4 may be approximately equal for all values of i (1≤i≤m). Thus, in the pre-distortion set mode, the controller 514 may set pre-distortion of the pre-distorter 512 via a set signal SET based on the second baseband signal BB2, which is generated from a second RF signal RF2 caused by simultaneously transmitting the plurality of first RF signals RF11 to RF1*m*.

Figure 6:
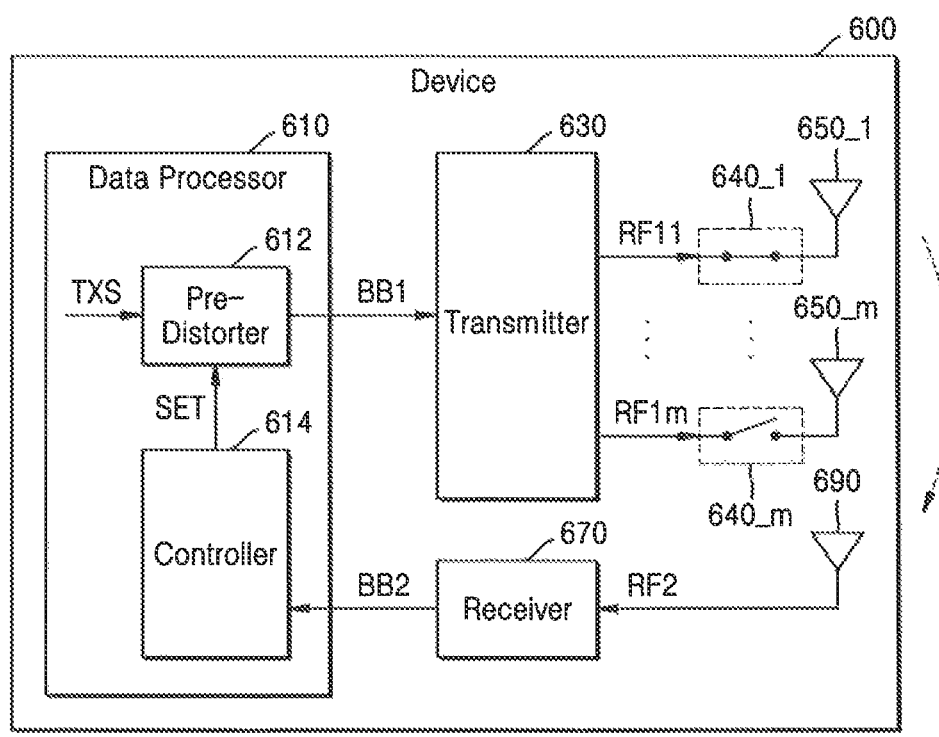
FIG. 6 is a block diagram of a device according to an exemplary embodiment of the inventive concept.

FIG. 6 is a block diagram of a device 600 according to an exemplary embodiment of the inventive concept. For example, FIG. 6 illustrates the device 600 configured to sequentially transmit a plurality of first RF signals RF11 to RF1*m* in a pre-distortion set mode. Similar to FIG. 2, a second baseband signal BB2 of FIG. 6 may function as the feedback FB of FIG. 1. As shown in FIG. 6, the device 600 may include a data processor 610, a transmitter 630, a plurality of switches 640_1 to 640_*m*, a plurality of first antennas 650_1 to 650_*m*, a receiver 670, and a second antenna 690.

The data processor 610 may provide a first baseband signal BB1 to the transmitter 630, and the transmitter 630 may generate a plurality of first RF signals RF11 to RF1*m* corresponding to the plurality of first antennas 650_1 to 650_*m* from the first baseband signal BB1. The plurality of switches 640_1 to 640_*m* may allow or prevent the transmission of the plurality of first RF signals RF11 to RF1*m* to the plurality of first antennas 650_1 to 650_*m*, respectively, via the control of a controller 614. In exemplary embodiments of the inventive concept, the controller 614 may control the plurality of switches 640_1 to 640_*m* to sequentially transmit the plurality of first RF signals RF11 to RF1*m* to the plurality of first antennas 650_1 to 650_*m*.

In exemplary embodiments of the inventive concept, unlike that shown in FIG. 6, the plurality of switches 640_1 to 640_*m* may be included in the transmitter 630. In exemplary embodiments of the inventive concept, the controller 614 may sequentially transmit the plurality of first RF signals RF11 to RF1*m* to the plurality of first antennas 650_1 to 650_*m* by sequentially powering up and down a plurality of components (e.g., a plurality of power amplifiers) included in the transmitter 630.

The receiver 670 may receive a second RF signal RF2 corresponding to each of the plurality of first RF signals RF11 to RF1*m* repeatedly and sequentially generate a plurality of second baseband signals BB2. In the pre-distortion set mode, the controller 614 may collect the plurality of second baseband signals BB2 and set pre-distortion of the pre-distorter 612 based on the plurality of second baseband signals BB2. In exemplary embodiments of the inventive concept, the controller 614 may set the pre-distortion of the pre-distorter 612 based on the average of the plurality of second baseband signals BB2.

Figure 7:
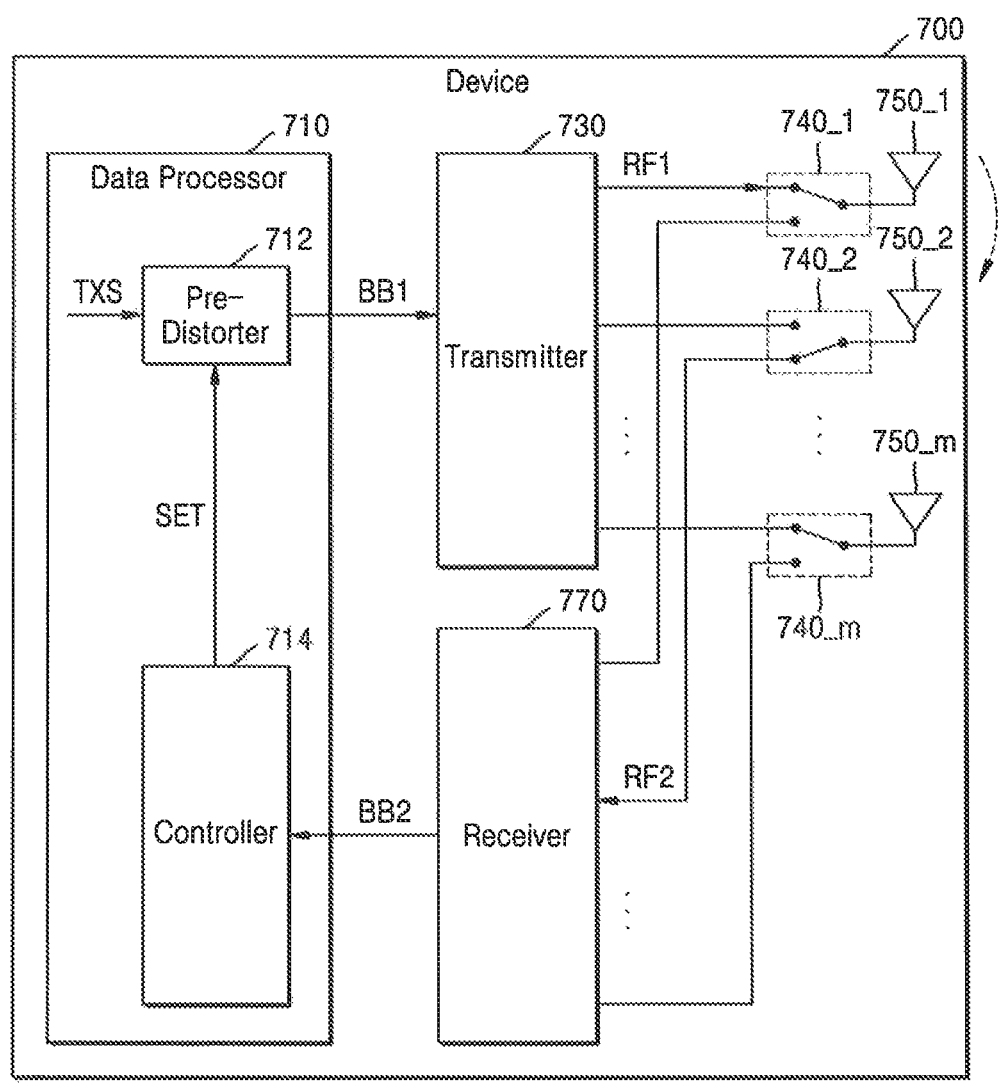
FIG. 7 is a block diagram of a device according to an exemplary embodiment of the inventive concept.

FIG. 7 is a block diagram of a device 700 according to an exemplary embodiment of the inventive concept. For example, FIG. 7 illustrates the device 700 configured to transmit and receive signals through the same antenna array. Similar to FIG. 2, a second baseband signal BB2 of FIG. 7 may function as the feedback FB of FIG. 1. As shown in FIG. 7, the device 700 may include a data processor 710, a transmitter 730, a plurality of switches 740_1 to 740_*m*, a plurality of antennas 750_1 to 750_*m*, and a receiver 770.

The data processor 710 may provide a first baseband signal BB1 to the transmitter 730, and the transmitter 730 may generate at least one first RF signal RF1 from the first baseband signal BB1. The plurality of switches 740_1 to 740_*m* may connect the antenna array (e.g., the plurality of antennas 750_1 to 750_*m*) to the transmitter 730 or the receiver 770 depending on a transmission mode or a receiving mode.

A controller 714 of the data processor 710 may control the plurality of switches 740_1 to 740_*m* so that at least one first RF signal RF1 may be transmitted through at least one of the plurality of antennas 750_1 to 750_*m* included in the antenna array and a second RF signal RF2 caused by the at least one first RF signal RF1 may be received through at least one of the plurality of antennas 750_1 to 750_*m*. For example, as shown in FIG. 7, the controller 714 may control a first switch 740_1 so that the first RF signal RF1 may be transmitted through a first antenna 750_1. Thus, a signal caused by the first RF signal RF1 may be induced on a second antenna 750_2 due to mutual coupling between the first antenna 750_1 and the second antenna 750_2. As shown in FIG. 7, the controller 714 may control a second switch 740_2 so that the second RF signal RF2 caused by the first RF signal RF1 may be received through the second antenna 750_2.

The receiver 770 may generate the second baseband signal BB2 from the second RF signal RF2 and provide the second baseband signal BB2 to the data processor 710. In a pre-distortion set mode, the controller 714 may set pre-distortion of the pre-distorter 712 of the data processor 710 based on the second baseband signal BB2.

Figure 8:
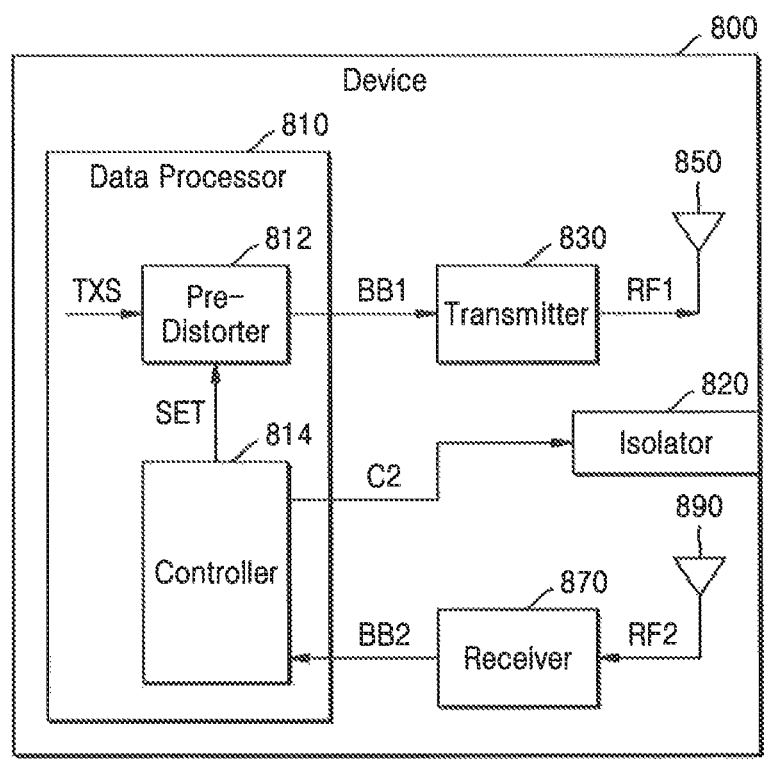
FIG. 8 is a block diagram of a device according to an exemplary embodiment of the inventive concept.

FIG. 8 is a block diagram of a device 800 according to an exemplary embodiment of the inventive concept. For example, FIG. 8 illustrates the device 800 including an isolator 820 located between a first antenna 850 and a second antenna 890. Similar to FIG. 2, a second baseband signal BB2 of FIG. 8 may function as the feedback FB of FIG. 1. As shown in FIG. 8, the device 800 may include a data processor 810, a transmitter 830, the first antenna 850, a receiver 870, the second antenna 890, and the isolator 820.

The data processor 810 may provide a first baseband signal BB1 to the transmitter 830, and the transmitter 830 may generate a first RF signal RF1 from the first baseband signal BB1 and provide the first RF signal RF1 to the first antenna 850. In a pre-distortion set mode, the receiver 870 may receive a second RF signal RF2, which is caused by the first RF signal RF1, through the second antenna 890, generate a second baseband signal BB2, and provide the second baseband signal BB2 to the data processor 810. In a wireless communication mode, the first antenna 850 may be used as a transmission antenna, and the second antenna 890 may be used as a receiving antenna.

The isolator 820 may provide variable coupling (or interference) between the first antenna 850 and the second antenna 890 via the control of the controller 814 of the data processor 810. For example, in a pre-distortion set mode, the controller 814 may provide a second control signal C2 to the isolator 820 so that the isolator 820 may provide relatively high coupling between the first antenna 850 and the second antenna 890 so that the second antenna 890 can receive the second RF signal RF2 caused by the first RF signal RF1. In addition, in a wireless communication mode, the controller 814 may provide the second control signal C2 to the isolator 820 so that the isolator 820 may provide relatively low coupling between the first antenna 850 and the second antenna 890 to reduce the influence of a signal transmitted through the first antenna 850 and received through the second antenna 890. In exemplary embodiments of the inventive concept, the isolator 820 may include materials of which phases are changed in response to the second control signal C2. In exemplary embodiments of the inventive concept, the isolator 820 may include a capacitor having a variable capacitance in response to the second control signal C2. In exemplary embodiments of the inventive concept, the isolator 820 may include a shield, which includes a conductor and moves in response to the second control signal C2.

Figure 9:
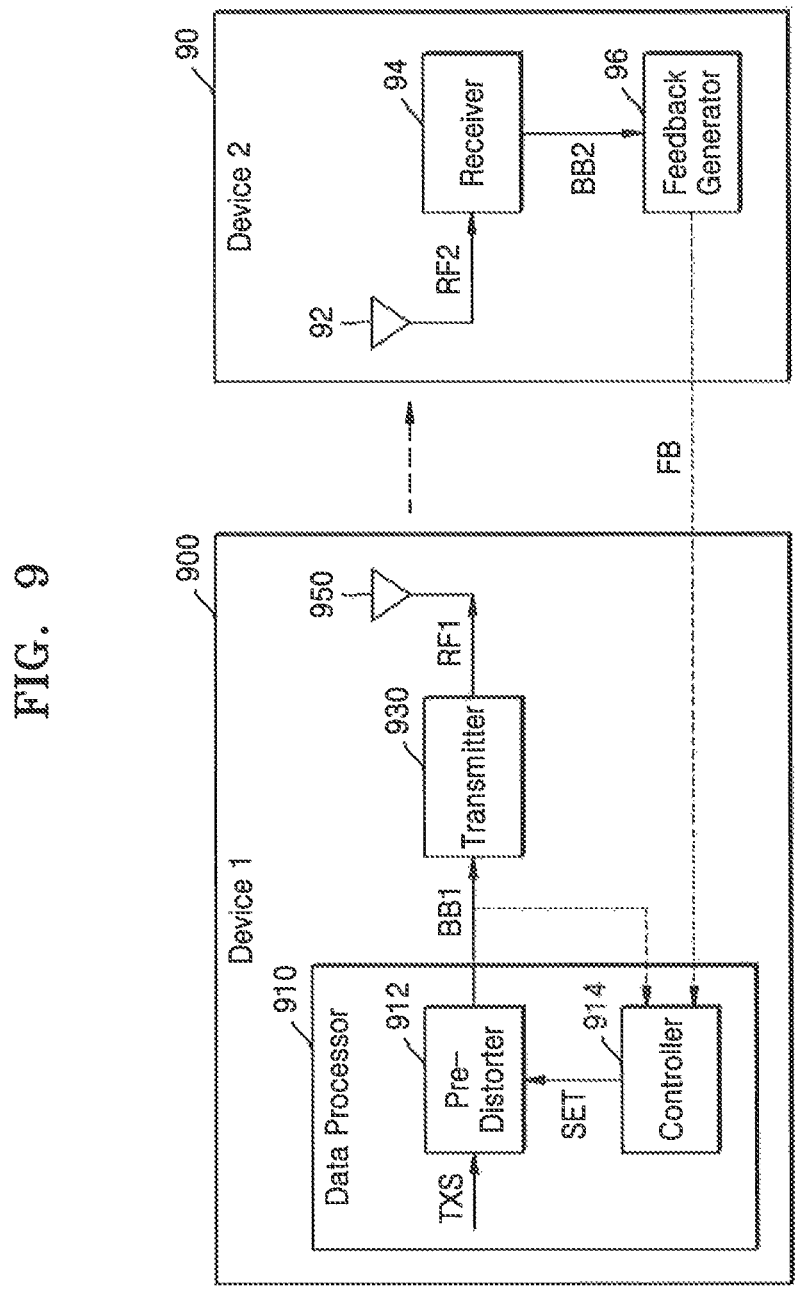
FIG. 9 is a block diagram of devices configured to communicate with each other according to an exemplary embodiment of the inventive concept.

FIG. 9 is a block diagram of devices configured to communicate with each other according to an exemplary embodiment of the inventive concept. For example, FIG. 9 illustrates an example in which a first device 900 receives a feedback FB from a second device 90 located outside the first device 900 to compensate nonlinearity of a transmitter 930 included in the first device 900. In exemplary embodiments of the inventive concept, the second device 90 may be the same type as the first device 900. In exemplary embodiments of the inventive concept, the second device 90 may be a dedicated device (e.g., measurement equipment) configured to provide a feedback FB to the first device 900.

Referring to FIG. 9, the first device 900 may include a data processor 910, the transmitter 930, and a first antenna 950. The data processor 910 may provide a first baseband signal BB1 to the transmitter 930, and the transmitter 930 may generate a first RF signal RF1 from the first baseband signal BB1. The first RF signal RF1 may be transmitted through the first antenna 950. Although the first device 900 is illustrated in FIG. 9 as including one first antenna 950, in exemplary embodiments of the inventive concept, the first device 900 may transmit the first RF signal RF1 through an antenna array including a plurality of antennas.

The second device 90 may include a second antenna 92, a receiver 94, and a feedback generator 96. The receiver 94 may receive a second RF signal RF2, which is caused by the first RF signal RF1, through the second antenna 92 and generate a second baseband signal BB2 from the second RF signal RF2. The feedback generator 96 may generate a feedback FB from the second baseband signal BB2, and provide the feedback FB to the first device 900. As described below, the feedback FB may be provided to the data processor 910 included in the first device 900 in various manners.

Figure 11:
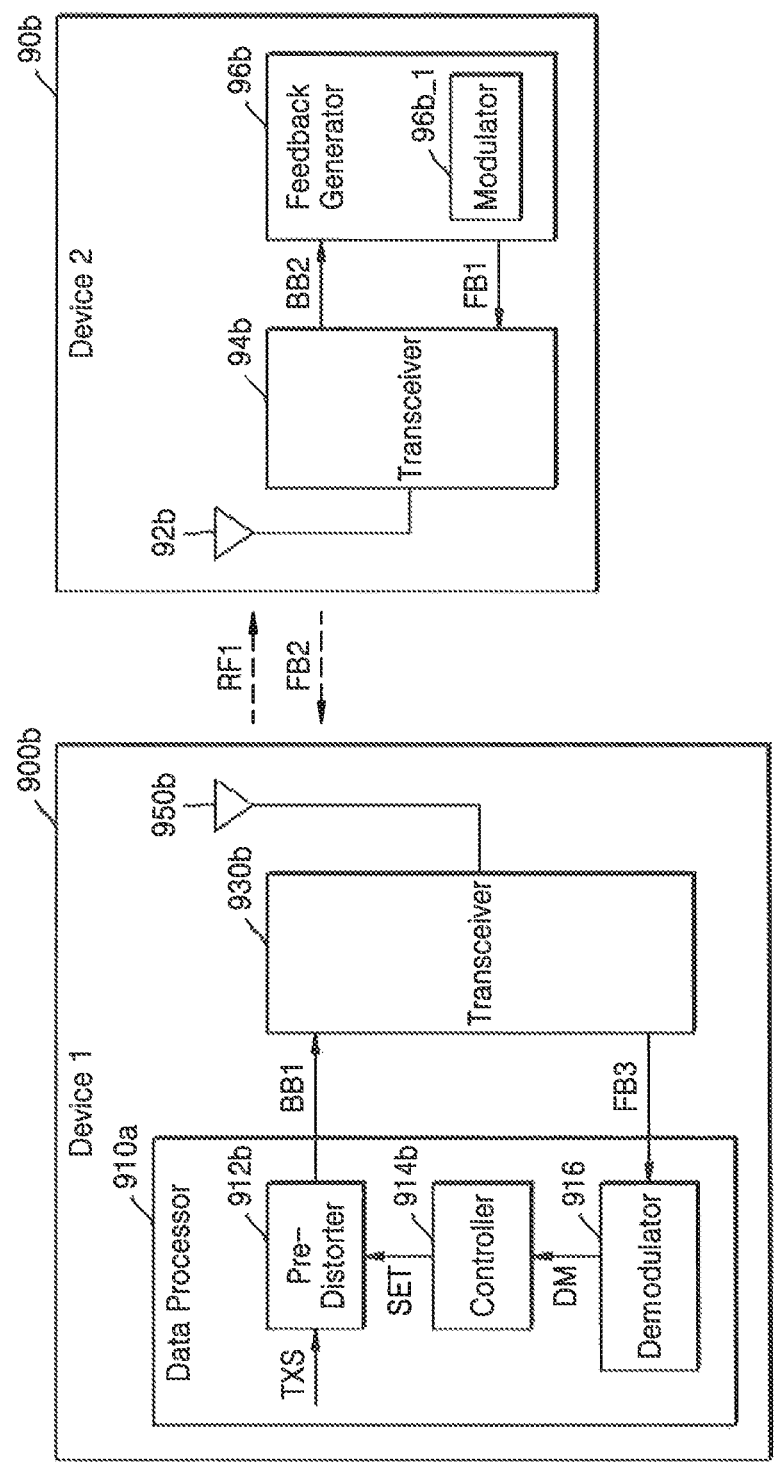
FIG. 11 is a block diagram of devices configured to communicate with each other according to an exemplary embodiment of the inventive concept.
Figure 12:
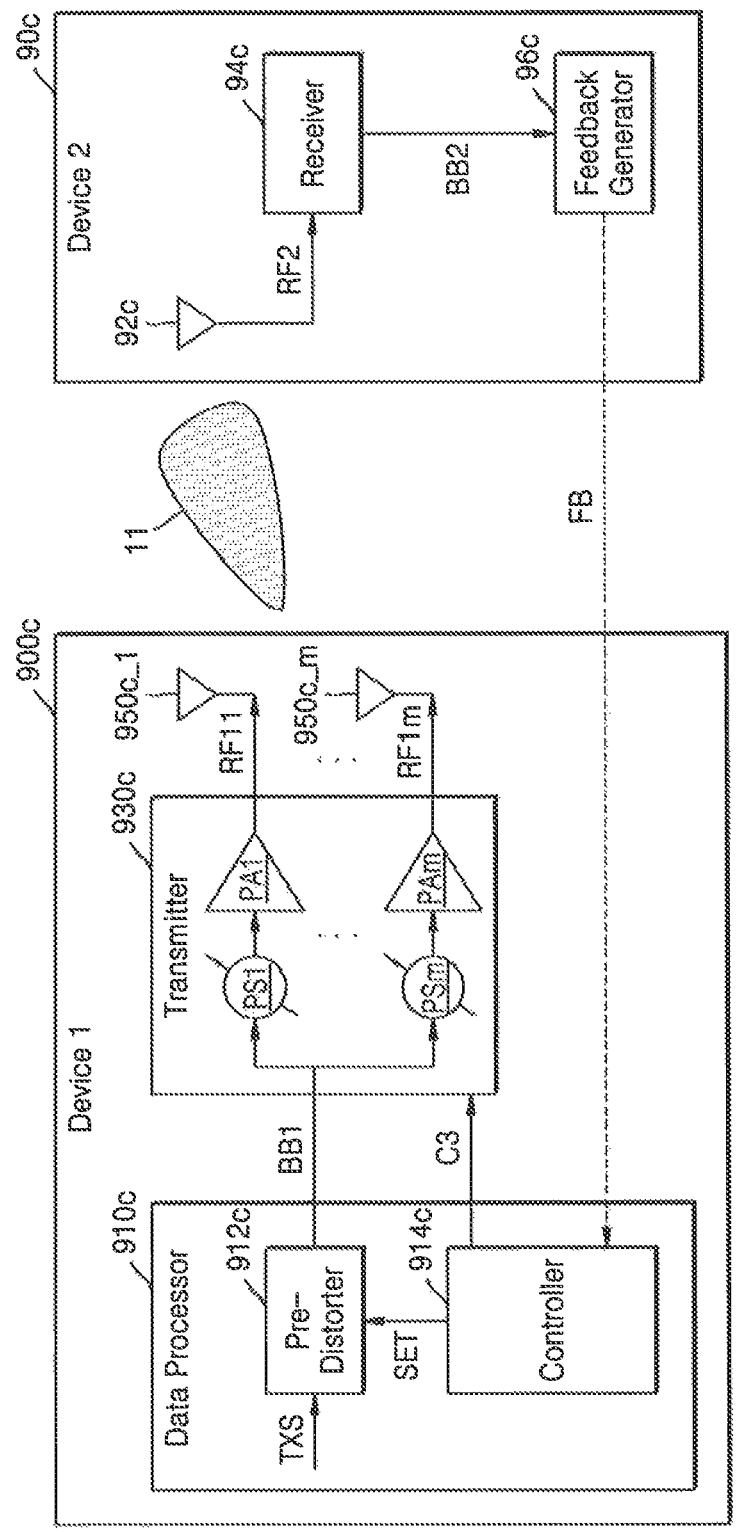
FIG. 12 is a block diagram of devices configured to communicate with each other according to an exemplary embodiment of the inventive concept.
Figure 13:
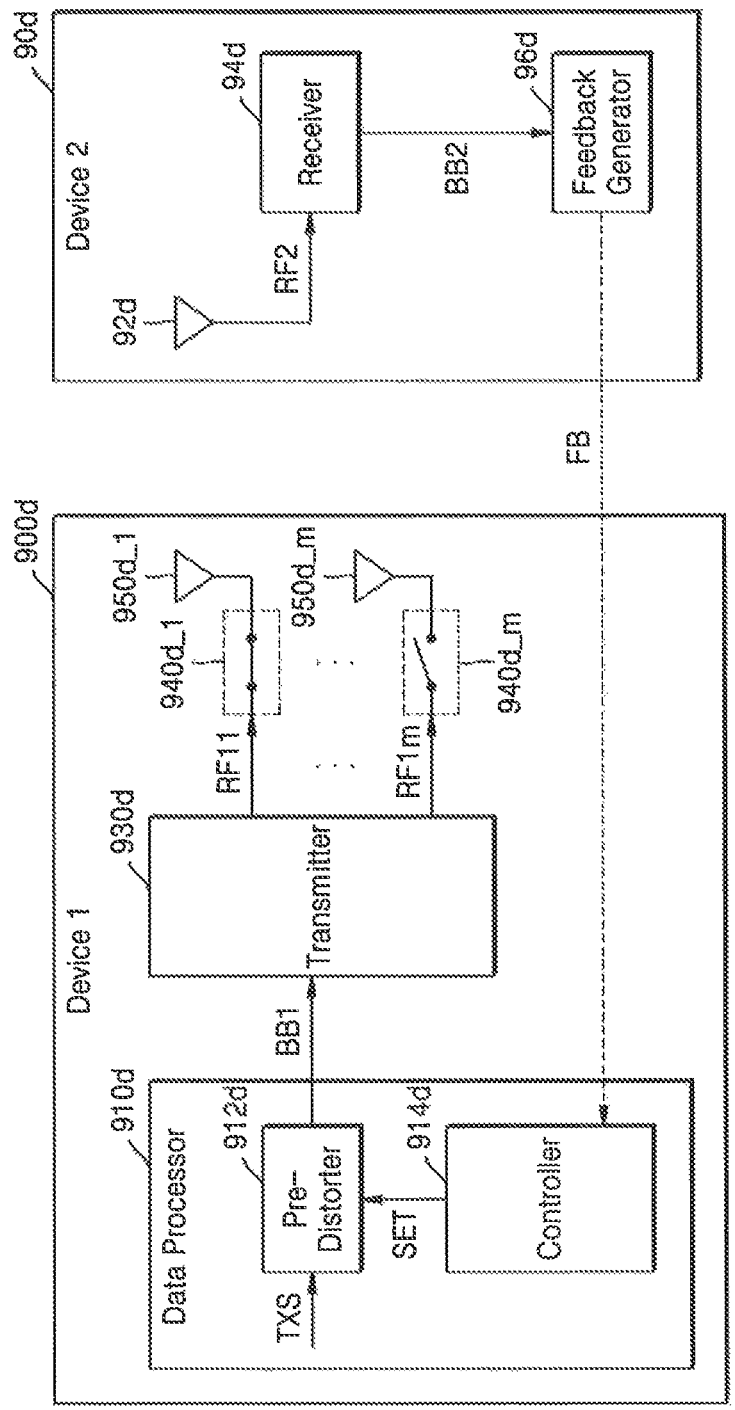
FIG. 13 is a block diagram of devices configured to communicate with each other according to an exemplary embodiment of the inventive concept.

The data processor 910 of the first device 900 may include a pre-distorter 912 and a controller 914. In a pre-distortion set mode, the controller 914 may generate a set signal SET for setting pre-distortion of the pre-distorter 912 based on the feedback FB or based on the feedback FB and the first baseband signal BB1. The pre-distorter 912 may distort a transmission signal TXS based on the pre-distortion set via the set signal SET and generate the first baseband signal BB1. Although FIGS. 11 to 13 illustrate a case in which a controller of a data processor receives only a feedback FB, it should be noted that the controller may receive the first baseband signal BB1.

Figure 10:
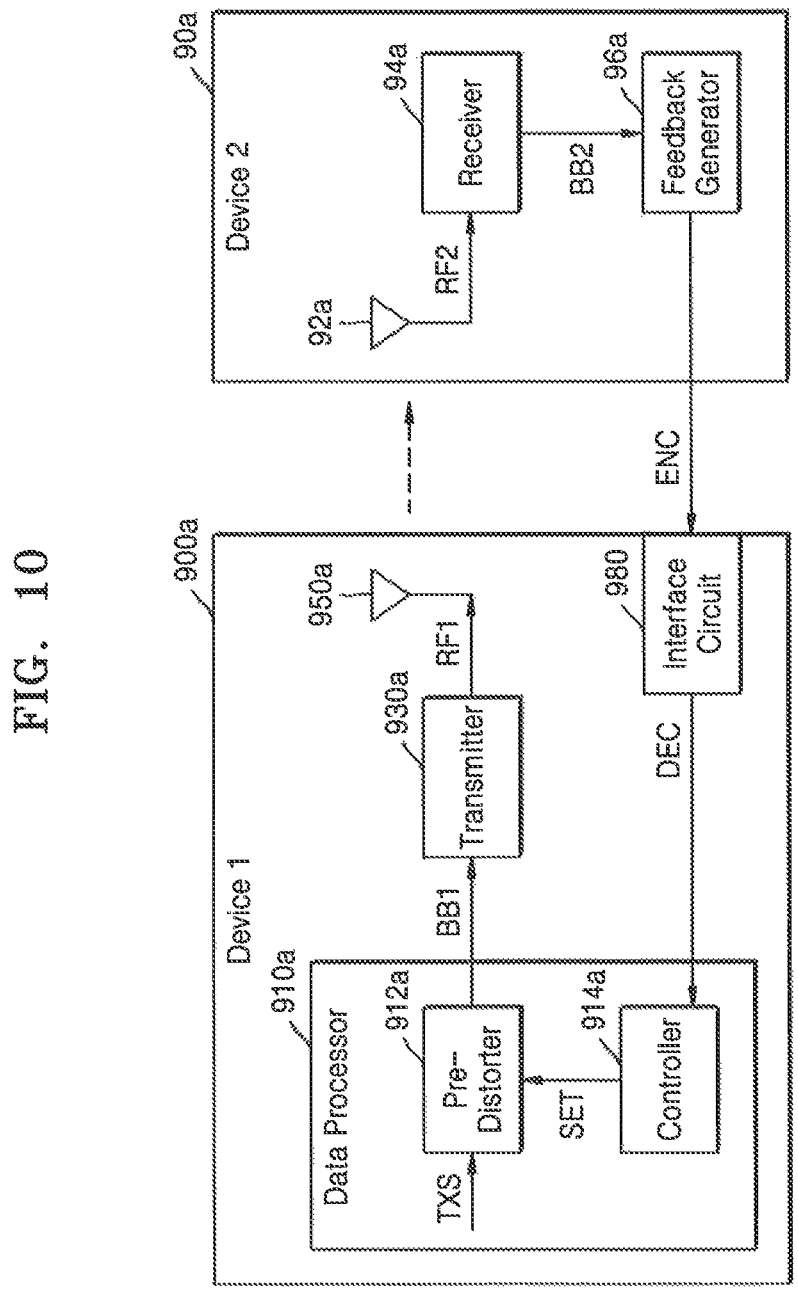
FIG. 10 is a block diagram of devices configured to communicate with each other according to an exemplary embodiment of the inventive concept.

FIG. 10 is a block diagram of devices configured to communicate with each other according to an exemplary embodiment of the inventive concept. For example, FIG. 10 illustrates a first device 900a including an interface circuit 980 configured to receive a feedback and a second device 90a configured to provide the feedback.

Referring to FIG. 10, the first device 900a may include a data processor 910a, a transmitter 930a, a first antenna 950a, and the interface circuit 980. The transmitter 930a may generate a first RF signal RF1 from a first baseband signal BB1 received from the data processor 910a, and provide the first RF signal RF1 to the first antenna 950a. The second device 90a may include a second antenna 92a, a receiver 94a, and a feedback generator 96a. The receiver 94a may generate a second baseband signal BB2 from the second RF signal RF2, and provide the second baseband signal BB2 to the feedback generator 96a.

The second device 90a may provide a feedback to the first device 900a through a communication channel that is different from a wireless communication channel through which the first RF signal RF1 is transmitted. For example, the second device 90a may transmit an encoded signal ENC as a feedback through a wired communication channel, such as a universal serial bus (USB) and a peripheral component interconnect (PCI) express. Alternatively, the second device 90a may transmit an encoded signal ENC as a feedback through a wireless communication channel, such as WiFi and Bluetooth. The interface circuit 980 of the first device 900a may receive the encoded signal ENC from the second device 90a according to a protocol, decode the encoded signal ENC according to the protocol, and provide a decoded signal DEC to the data processor 910a. In a pre-distortion set mode, a controller 914a of the data processor 910a may receive the decoded signal DEC as a feedback, generate a set signal SET based on the decoded signal DEC, and set pre-distortion of the pre-distorter 912a via the set signal SET. In a wireless communication mode, the pre-distorter 912a of the data processor 910a may distort a transmission signal TXS based on the set pre-distortion and generate the first baseband signal BB1.

FIG. 11 is a block diagram of devices configured to communicate with each other according to an exemplary embodiment of the inventive concept. For example, FIG. 11 illustrates an example in which a first RF signal RF1 and a feedback are transmitted through the same wireless channel.

Referring to FIG. 11, a first device 900b may include a data processor 910b, a transceiver 930b, and a first antenna 950b. The transceiver 930b may generate a first RF signal RF1 from a first baseband signal BB1 received from the data processor 910b, and transmit the first RF signal RF1 through the first antenna 950b to a second device 90b.

The second device 90b may include a second antenna 92b, a transceiver 94b, and a feedback generator 96b. The second antenna 92b may receive the first RF signal RF1, and the transceiver 94b may generate a second baseband signal BB2, and provide the second baseband signal BB2 to the feedback generator 96b. The feedback generator 96b may generate a first feedback signal FB1 based on the second baseband signal BB2. As shown in FIG. 11, the feedback generator 96*b* may include a modulator 96*b*_1. To provide the feedback through the same wireless channel as a wireless channel through which the first RF signal RF1 is transmitted, the modulator 96*b*_1 may modulate the second baseband signal BB2 or a signal generated from the second baseband signal BB2 and generate the first feedback signal FB1. The transceiver 94*b* may generate a second feedback signal FB2, which is an RF-band signal, from the first feedback signal FB1, which is a baseband signal, and provide the second feedback signal FB2 through the second antenna 92*b* to the first device 900*b*. The transceiver 930*b* of the first device 900*b* may receive the second feedback signal FB2 through the first antenna 950*b*, and generate a third feedback signal FB3, which is a baseband signal, from the second feedback signal FB2, which is an RF-band signal. The third feedback signal FB3 may be provided to the data processor 910*b*.

The data processor 910*b* may include a pre-distorter 912*b*, a controller 914*b*, and a demodulator 916. The demodulator 916 may demodulate the third feedback signal FB3 using a demodulation scheme corresponding to a modulation scheme of the modulator 96*b*. 1 of the second device 90*b*, generate a demodulated signal DM, and provide the demodulated signal DM to the controller 914*b*. In a pre-distortion set mode, the controller 914*b* may generate a set signal SET based on the demodulated signal DM. In a wireless communication mode, the pre-distorter 912*b* may distort a transmission signal TXS according to set pre-distortion and generate the first baseband signal BB1. In exemplary embodiments of the inventive concept, the first device 900*b* and the second device 90*b* may be the same kind of device, for example, the first and second devices 900*b* and 90*b* may be terminals of the same wireless communication system.

FIG. 12 is a block diagram of devices configured to communicate with each other according to an exemplary embodiment of the inventive concept. For example, FIG. 12 illustrates a first device 900*c* configured to transmit a signal through an antenna array configured to form a beam 11 and a second device 90*c* configured to provide a feedback FB to the first device 900*c*.

As described above with reference to FIG. 5, the first device 900*c* may form the beam 11 toward a second antenna 92*c* of the second device 90*c*. For example, a controller 914*c* of a data processor 910*c* may control a plurality of phase shifters PS1 to PSm of a transmitter 930*c* through a third control signal C3. The controller 914*c* of the data processor 910*c* may generate the third control signal C3 so that a plurality of first RF signals RF11 to RF1*m* output through a plurality of power amplifiers PA1 to PAm may form the beam 11.

The second device 90*c* may receive the beam 11 through the second antenna 92*c*, and a feedback generator 96*c* may provide the feedback FB to the first device 900*c* based on a second baseband signal BB2 generated by a receiver 94*c* from a second RF signal RF2. For example, in exemplary embodiments of the inventive concept, as described above with reference to FIG. 10, the feedback FB may be provided to the first device 900*c* through an additional communication channel. In exemplary embodiments of the inventive concept, as described above with reference to FIG. 11, the feedback FB may be provided through the same wireless channel as the beam 11. In a pre-distortion set mode, the controller 914*c* of the first device 900*c* may generate a set signal SET based on the feedback FB. In a wireless communication mode, the pre-distorter 912*c* may distort a transmission signal TXS based on the set pre-distortion and generate a first baseband signal BB1.

FIG. 13 is a block diagram of devices configured to communicate with each other according to an exemplary embodiment of the inventive concept. For example, FIG. 13 illustrates a first device 900*d* configured to sequentially transmit a plurality of first RF signals RF11 to RF1*m* in a pre-distortion set mode and a second device 90*d* configured to provide a feedback FB to the first device 900*d*.

As described above with reference to FIG. 6, the first device 900*d* may sequentially transmit the plurality of first RF signals RF11 to RF1*m*, which are generated by a transmitter 930*d*. For example, the first device 900*d* may include a plurality of switches 940*d*_1 to 940*d*_m. A controller 914*d* of a data processor 910*d* may sequentially turn on and/or turn off the plurality of switches 940*d*_1 to 940*d*_m in the pre-distortion set mode. The second device 90*d* may sequentially receive the plurality of first RF signals RF11 to RF1*m* through a second antenna 92*d*. The plurality of first RF signals RF11 to RF1*m* may be output via a plurality of first antennas 950*d*_1 to 950*d*_m. A receiver 94*d* of the second device 90*d* may generate a second baseband signal BB2 repeatedly from a second RF signal RF2 that is received repeatedly.

A feedback generator 96*d* of the second device 90*d* may provide the feedback FB to the first device 900*d* based on the second baseband signal BB2 that is generated repeatedly, in other words, a plurality of second baseband signals BB2. In exemplary embodiments of the inventive concept, the feedback generator 96*d* may provide the feedback FB to the first device 900*d* each time the second baseband signal BB2 is received. In exemplary embodiments of the inventive concept, the feedback generator 96*d* may provide one feedback FB to the first device 900*d* based on the plurality of second baseband signals BB2. In the pre-distortion set mode, the controller 914*d* of the first device 900*d* may generate a set signal SET based on the feedback FB. In a wireless communication mode, the pre-distorter 912*d* may distort a transmission signal TXS based on set pre-distortion and generate a first baseband signal BB1.

Figure 14:
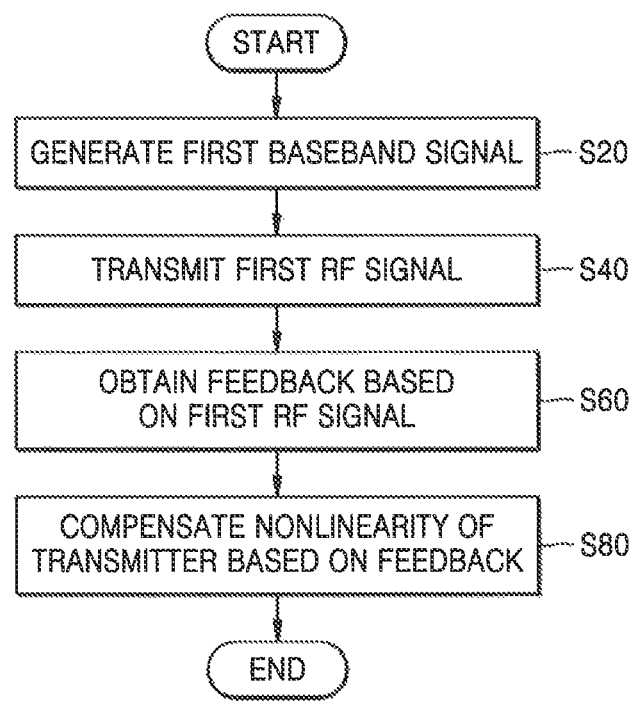
FIG. 14 is a flowchart of a method of compensating nonlinearity of a transmitter according to an exemplary embodiment of the inventive concept.

FIG. 14 is a flowchart of a method of compensating nonlinearity of a transmitter according to an exemplary embodiment of the inventive concept. For example, the method of FIG. 14 may be performed by the first device 100 of FIG. 1, and will now be described with reference to FIG. 1.

In operation S20, an operation of generating a first baseband signal BB1 may be performed. For example, the pre-distorter 112 of the data processor 110 may generate the first baseband signal BB1. The first baseband signal BB1 generated in a pre-distortion set mode may be a predefined signal in exemplary embodiments of the inventive concept, or a signal generated from a transmission signal TXS in exemplary embodiments of the inventive concept.

In operation S40, an operation of transmitting a first RF signal RF1 may be performed. For example, the transmitter 130 may generate a first RF signal RF1 from the first baseband signal BB1 and transmit the first RF signal RF1 through the antenna 150.

In operation S60, an operation of obtaining the feedback FB based on the first RF signal RF1 may be performed. Thus, the feedback FB may be generated based on a signal transmitted through the antenna 150, thereby compensating distortion easily and precisely.

In operation S80, an operation of compensating nonlinearity of the transmitter 130 based on the feedback FB may be performed. For example, in the pre-distortion set mode, pre-distortion of the pre-distorter 112 may be set based on the feedback FB. In the wireless communication mode, the pre-distorter 112 may perform the set pre-distortion and generate the first baseband signal BB1.

Figure 15A:
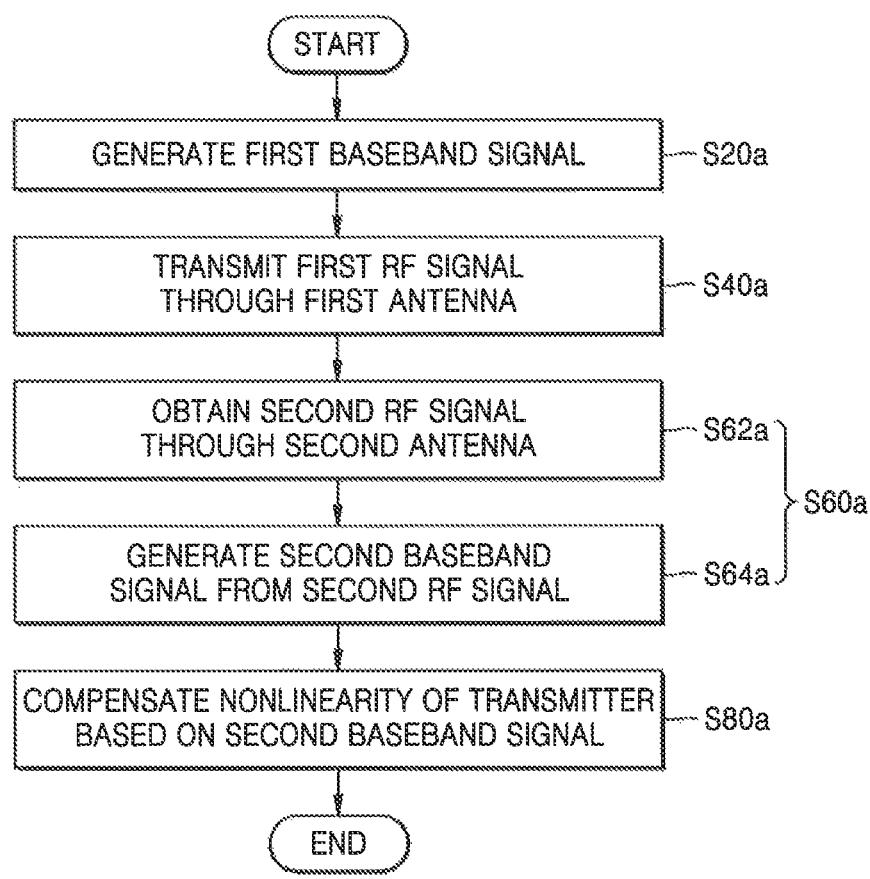
FIGS. 15A and 15B are flowcharts of methods of compensating nonlinearity of a transmitter according to exemplary embodiments of the inventive concept.
Figure 15B:
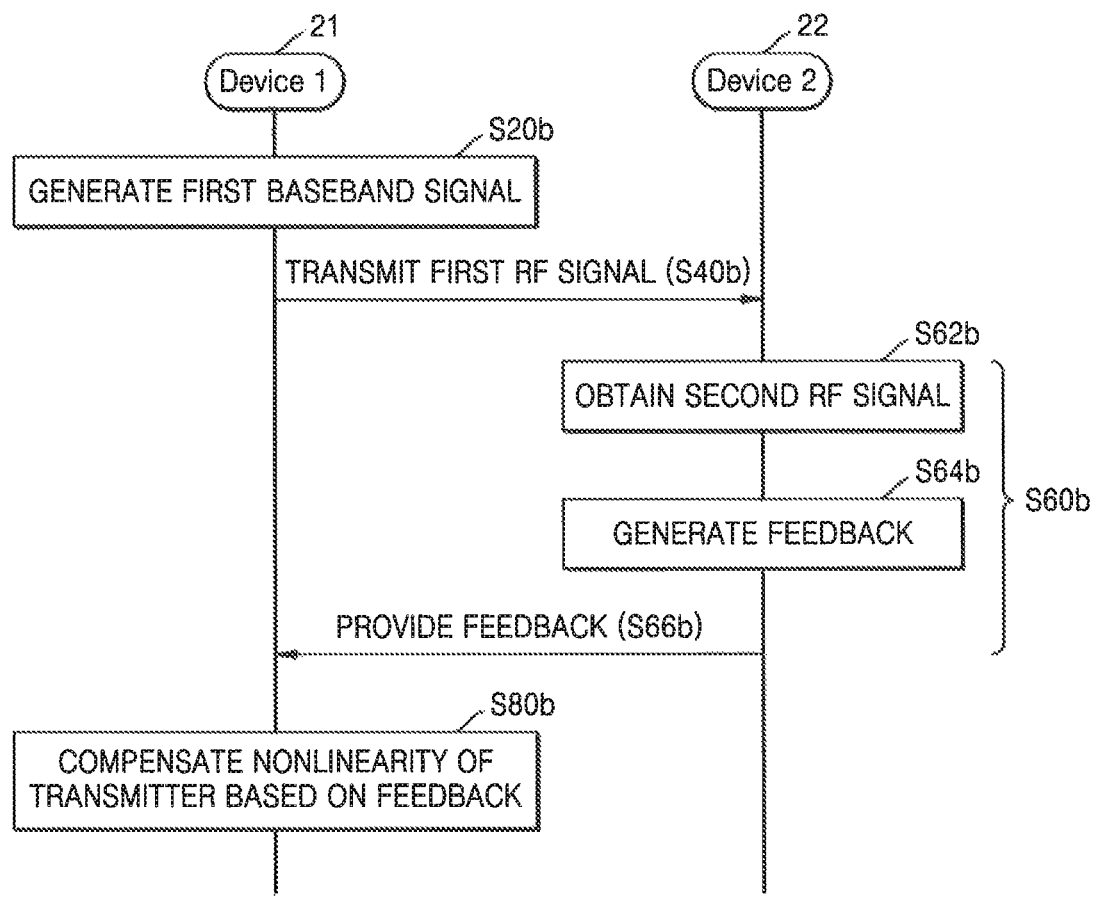

FIGS. 15A and 15B are flowcharts of methods of compensating nonlinearity of a transmitter according to exemplary embodiments of the inventive concept. For example, FIG. 15A illustrates a method of generating a feedback for pre-distortion based on an RF signal that is received through an antenna included in a device including a transmitter. FIG. 15B illustrates a method of receiving a feedback from a device located outside a device including a transmitter. For example, the method of FIG. 15A may be performed by the device 200 of FIG. 2, and the method of FIG. 15B may be performed by the device 900 of FIG. 9. Hereinafter, FIG. 15A will be described with reference to FIG. 2, and FIG. 15B will be described with reference to FIG. 9. In addition, the same description as in FIG. 14 may be omitted.

Referring to FIG. 15A, in operation S20a, an operation of generating a first baseband signal BB1 may be performed. Next, in operation S40a, an operation of transmitting a first RF signal RF1 through the first antenna 250 may be performed.

In operation S60a, an operation of obtaining a feedback may be performed. As shown in FIG. 15A, operation S60a may include operation S62a and operation S64a. In operation S62a, an operation of obtaining a second RF signal RF2 through the second antenna 290 may be performed. For example, the receiver 270 may receive the second RF signal RF2 from the second antenna 290. In operation S64a, an operation of generating a second baseband signal BB2 from the second RF signal RF2 may be performed. For instance, the receiver 270 may generate the second baseband signal BB2 from the second RF signal RF2 and provide the second baseband signal BB2 to the data processor 210.

Next, in operation S80a, an operation of compensating nonlinearity of the transmitter 230 based on the second baseband signal BB2 may be performed.

Referring to FIG. 15B, a second device 22 may generate a feedback to compensate nonlinearity of a transmitter included in the first device 21. In FIG. 15B, it is assumed that the first device 21 includes components of the first device 900 of FIG. 9.

In operation S20b, the first device 21 may generate a first baseband signal BB1. Next, in operation S40b, the first device 21 may transmit a first RF signal RF1 to the second device 22. For example, the first device 21 may include a first antenna 950 and transmit the first RF signal RF1 through the first antenna 950.

In operation S60b, an operation of generating and obtaining a feedback may be performed. As shown in FIG. 15B, operation S60b may include a plurality of operations S62b, S64b, and S66b. In operation S62b, the second device 22 may obtain a second RF signal RF2. For example, the second device 22 may include a second antenna 92 and receive the second RF signal RF2 through the second antenna 92. In operation S64b, an operation of generating a feedback may be performed. For instance, a second baseband signal BB2 may be generated from the second RF signal RF2, and the feedback may be generated based on the second baseband signal BB2. In operation S66b, the second device 22 may provide the feedback to the first device 21. For example, the second device 22 may provide a feedback to the first device 21 through the same wireless channel as a wireless channel through which the first RF signal RF1 is transmitted. Alternatively, the second device 22 may provide a feedback to the first device 21 through a communication channel different from the wireless channel through which the first RF signal RF1 is transmitted.

Next, in operation S80b, the first device 21 may perform an operation of compensating the nonlinearity of the transmitter 930 based on the feedback.

Figure 16:
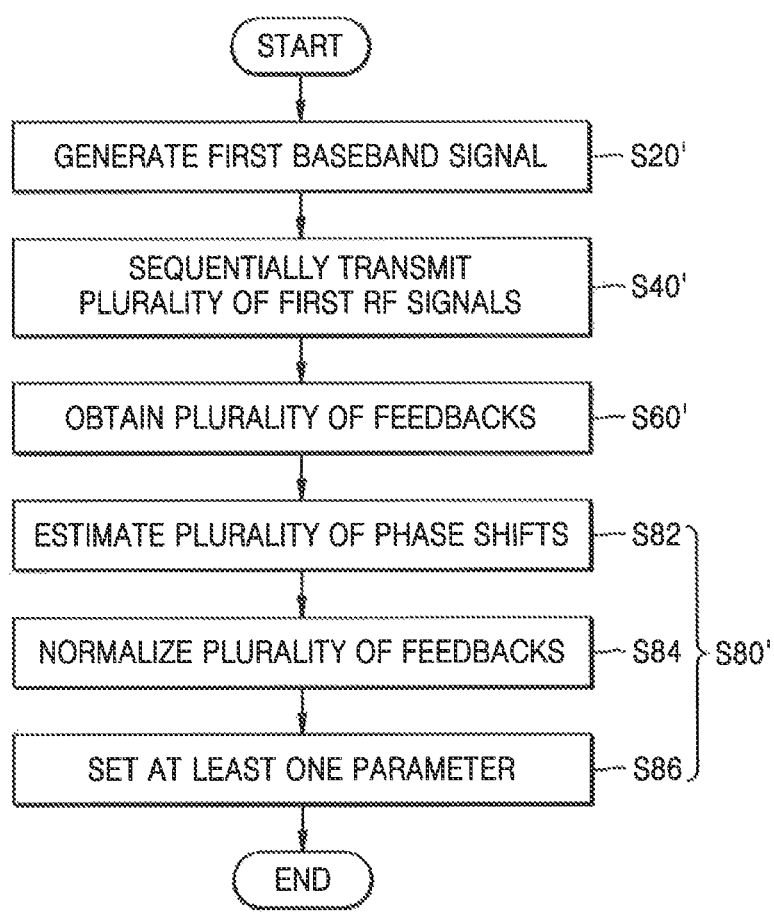
FIG. 16 is a flowchart of a method of compensating nonlinearity of a transmitter according to an exemplary embodiment of the inventive concept.

FIG. 16 is a flowchart of a method of compensating nonlinearity of a transmitter according to an exemplary embodiment of the inventive concept. For example, FIG. 16 illustrates a method of compensating nonlinearity of a transmitter configured to provide a plurality of first RF signals to an antenna array. For instance, the method of FIG. 16 may be performed by the device 600 of FIG. 6 or the first device 900d of FIG. 13. Hereinafter, the method of FIG. 16 will be described with reference to FIG. 6. In FIG. 16, the same description as in FIG. 14 may be omitted.

In operation S20', an operation of generating a first baseband signal BB1 may be performed. In operation S40', an operation of sequentially transmitting a plurality of first RF signals RF11 to RF1m may be performed. For example, a controller 614 may control a plurality of switches 640_1 to 640_m and sequentially transmit the plurality of first RF signals RF11 to RF1m. In operation S60', an operation of obtaining a plurality of feedbacks may be performed. For example, the receiver 670 may sequentially receive a plurality of second RF signals corresponding to the plurality of first RF signals RF11 to RF1m through a second antenna 690, and generate a plurality of second baseband signals corresponding to the plurality of second RF signals.

In operation S80', an operation of compensating the nonlinearity of the transmitter 630 based on a feedback may be performed. As shown in FIG. 16, operation S80' may include a plurality of operations S82, S84, and S86. In operation S82, an operation of estimating a plurality of phase shifts may be performed. For example, referring to Equation 4, the controller 614 may calculate the average of m feedbacks for a predetermined period of time and estimate a value of $(\text{shifter}_i + \text{path}_i)$ $(1 \leq i \leq m)$. In operation S84, an operation of normalizing a plurality of feedbacks may be performed. For example, a normalized second baseband signal $BB\_\text{norm}_i$ may be expressed in Equation 5 $(1 \leq i \leq m)$:

$$BB2\_\text{norm}_i = BB2 \cdot \exp(-j \cdot (\text{shifter}_i + \text{path}_i)) \quad (5).$$

In operation S86, an operation of setting at least one parameter may be performed. For example, the controller 614 may calculate the average of m normalized second baseband signals, provide a set signal SET to the pre-distorter 612, and set at least one parameter for defining pre-distortion based on the average.

Figure 17:
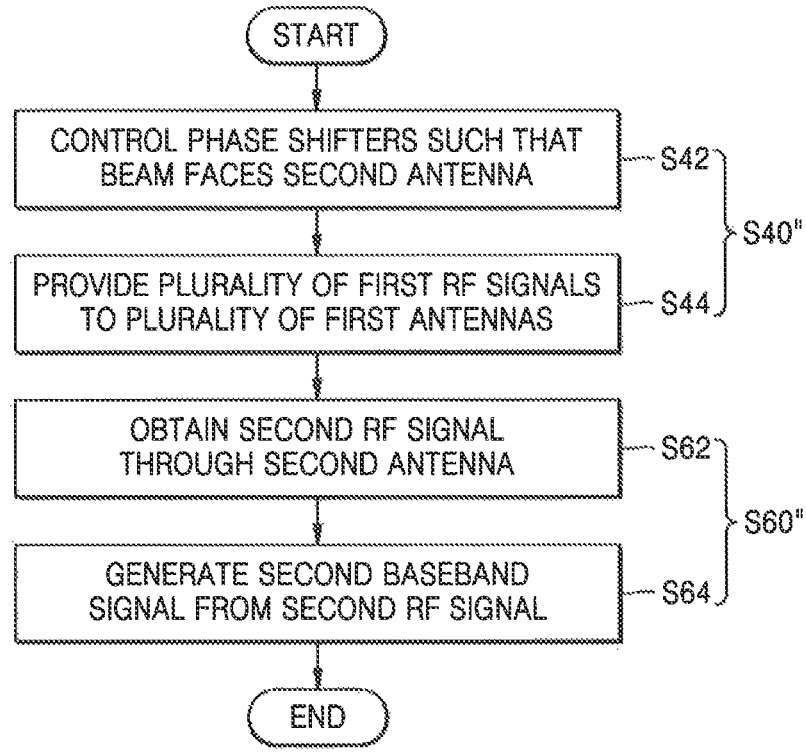
FIG. 17 is a flowchart of operation S40 and S60 of FIG. 14, according to an exemplary embodiment of the inventive concept.

FIG. 17 is a flowchart of an example of operations S40 and S60 of FIG. 14, according to an exemplary embodiment of the inventive concept. For example, FIG. 17 illustrates an example in which an antenna array forms a beam to generate a feedback. As described above with reference to FIG. 14, an operation of transmitting a first RF signal RF1 may be performed in operation S40" of FIG. 17 and an operation of obtaining a feedback based on the first RF signal RF1 may be performed in operation S60" of FIG. 17. For example, operations S40" and S60" of FIG. 17 may be performed by the device 500 of FIG. 5 or the first device 900c of FIG. 12. Hereinafter, FIG. 17 will be described with reference to FIG. 5.

Referring FIG. 17, operation S40" may include operation S42 and operation S44. In operation S42, an operation of controlling phase shifters PS1 to PSm such that a beam 4 is oriented toward a second antenna 590 may be performed. For example, a controller 514 may generate a first control signal C1 and provide the first control signal C1 to the transmitter 530 such that a plurality of first RF signals RF11 to RF1m form the beam 4 toward the second antenna 590.

The plurality of phase shifters PS1 to PSm may shift phases of the plurality of first RF signals RF11 to RF1m in response to the first control signal C1.

In operation S44, an operation of providing the plurality of first RF signals RF11 to RF1m to a plurality of first antennas 550_1 to 550_m may be performed. For example, the transmitter 530 may provide the plurality of first RF signals RF11 to RF1m of which phases are shifted by the plurality of phase shifters PS1 to PSm, to the plurality of first antennas 550_1 to 550_m.

Referring FIG. 17, operation S60" may include operation S62 and operation S64. In operation S62, an operation of obtaining a second RF signal RF2 through the second antenna 590 may be performed. For example, the receiver 570 may receive the second RF signal RF2 from the second antenna 590.

In operation S64, an operation of generating a second baseband signal BB2 from the second RF signal RF2 may be performed. For instance, the receiver 570 may generate the second baseband signal BB2 from the second RF signal RF2 and provide the second baseband signal BB2 to the data processor 510. The beam 4 formed in operation S40" may be received to generate the second baseband signal BB2. Unlike in the example in which the plurality of feedbacks are obtained as described with reference to FIG. 16, in exemplary embodiments of the inventive concept, a single feedback may be obtained, and nonlinearity of the transmitter 530 may be compensated based on the single feedback.

Figure 18:
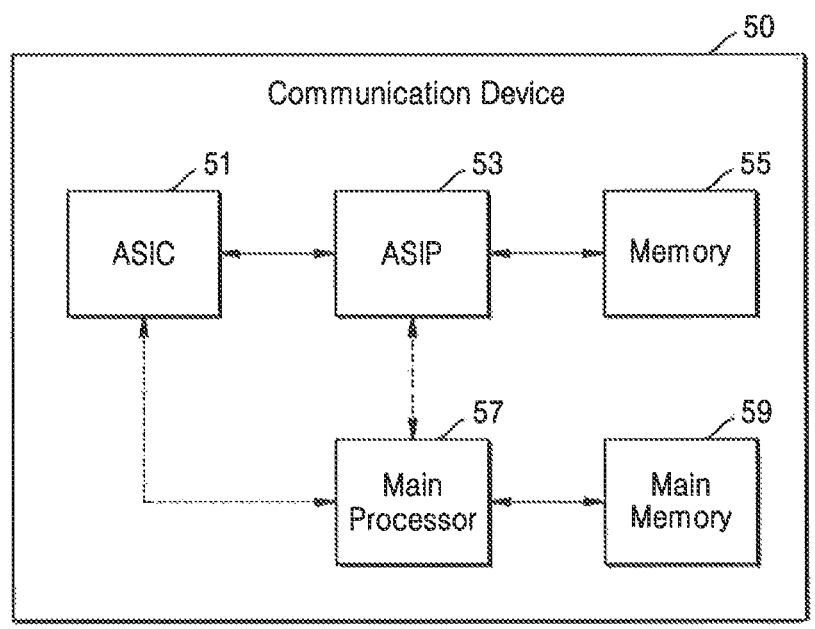
FIG. 18 is a block diagram of a communication device according to an exemplary embodiment of the inventive concept.

FIG. 18 is a block diagram of a communication device 50 according to an exemplary embodiment of the inventive concept. As shown in FIG. 18, the communication device 50 may include an application specific integrated circuit (ASIC) 51, an application specific instruction set processor (ASIP) 53, a memory 55, a main processor 57, and a main memory 59. At least two of the ASIC 51, the ASIP 53, and the main processor 57 may communicate with each other. In addition, at least one of the ASIC 51, the ASIP 53, the memory 55, the main processor 57, and the main memory 59 may be embedded in a single chip.

The ASIP 53 may be an IC customized for specific purposes. The ASIP 53 may support a dedicated instruction set for a specific application and execute an instruction included in the instruction set. The memory 55 may communicate with the ASIP 53. The memory 55 may be a non-transitory storage device configured to store a plurality of instructions executed by the ASIP 53. For example, the memory 55 may include, but is not limited to, any type of memory accessible by the ASIP 53, such as random access memory (RAM), read-only memory (ROM), a tape, a magnetic disk, an optical disk, a volatile memory, a non-volatile memory, and a combination thereof.

The main processor 57 may execute a plurality of instructions and control the communication device 50. For example, the main processor 57 may control the ASIC 51 and the ASIP 53 and process data received through a MIMO channel or process a user's input for the communication device 50. The main memory 59 may communicate with the main processor 57. The main memory 59 may be, a non-transitory storage device configured to store a plurality of instructions executed by the main processor 57. For example, the main memory 59 may include, but is not limited to, any type of memory accessible by the main processor 57, such as RAM, ROM, a tape, a magnetic disk, an optical disk, a volatile memory, a non-volatile memory, and a combination thereof.

The above-described method of compensating the nonlinearity of the transmitter according to an exemplary embodiment of the inventive concept may be performed by at least one of components included in the communication device 50 of FIG. 18. For example, the above-described data processor(s) may include at least one of the ASIC 51, the ASIP 53, the memory 55, the main processor 57, and the main memory 59. In exemplary embodiments of the inventive concept, at least one of the above-described operations of the method of compensating the nonlinearity of the transmitter may be implemented as a plurality of instructions stored in the memory 55. In exemplary embodiments of the inventive concept, the ASIP 53 may execute the plurality of instructions stored in the memory 55 and perform at least one of the operations of the method of compensating the nonlinearity of the transmitter. In exemplary embodiments of the inventive concept, at least one of the operations of the method of compensating the nonlinearity of the transmitter may be implemented as a hardware block designed by logic synthesis, and included in the ASIC 51. In exemplary embodiments of the inventive concept, at least one of the operations of the method of compensating the nonlinearity of the transmitter may be implemented as the plurality of instructions stored in the main memory 59. The main processor 57 may execute the plurality of instructions stored in the main memory 59 and perform at least one of the operations of the method of compensating the nonlinearity of the transmitter.

While the inventive concept has been particularly shown and described with reference to exemplary embodiments thereof, it will be understood that various changes in form and details may be made therein without departing from the spirit and scope of the inventive concept as defined by the following claims.

What is claimed is:

1. A communication device, comprising:
a transmitter for providing a plurality of first radio frequency (RF) signals to an array of first antennas, wherein the transmitter includes a plurality of phase shifters;
a second antenna for receiving the plurality of first RF signals from the array of first antennas to produce a second RF signal;
a receiver for receiving the second RF signal from the second antenna, wherein the receiver generates a feedback signal from the second RF signal; and
a controller configured to control pre-distortion based on the feedback signal,
wherein the second RF signal is based on a beam formed by the plurality of first RF signals, and the controller is configured to control the plurality of phase shifters to direct the beam toward the second antenna.

2. The communication device of claim 1, further comprising a pre-distorter, wherein the controller controls the pre-distorter based on the feedback signal.

3. The communication device ef claim 2, wherein the pre-distorter generates a baseband signal based on the feedback signal and provides the baseband signal to the transmitter.

4. The communication device of claim 1, wherein the second RF signal is based on at least one of the plurality of first RF signals.

5. The communication device of claim 1, further comprising a plurality of switches connected between the transmitter and the array of first antennas, wherein the controller is configured to control the plurality of switches to transmit the plurality of first RF signals to the array of first antennas.

6. The communication device of claim 5, wherein the receiver is configured to generate the feedback signal by taking an average of the plurality of first RF signals.

7. The communication device of claim 1, further comprising a plurality of switches for connecting the array of first antennas or the second antenna to the transmitter or the receiver.

8. The communication device of claim 7, wherein the controller is configured to control a first switch so that one of the plurality of first RF signals is transmitted through one of the array of first antennas, and wherein the controller is further configured to control a second switch so that the one first RF signal is received through the second antenna.

9. The communication device of claim 1, further comprising an isolator located between the array of first antennas and the second antenna.

10. The communication device of claim 9, wherein the isolator is configured to provide variable coupling between the array of first antennas and the second antenna.

11. A communication system, comprising:
a first device including a transmitter for outputting a first radio frequency (RF) signal through a first antenna; and
a second device including a second antenna for receiving the first RF signals to produce a second RF signal, a receiver for receiving the second RF signals from the second antenna, and a feedback generator for generating a feedback signal from the second RF signal,
wherein the first device further includes a controller configured to control pre-distortion in response to the feedback signal provided from the second device, and
wherein the feedback signal is provided from the second device to the first device via a wired signal path.

12. The communication system of claim 11, wherein the first device further includes an interface circuit for receiving an encoded signal as the feedback signal from the second device and for decoding the encoded signal according to a wired protocol.

13. The communication system of claim 11, wherein the first device further includes an array of first antennas for outputting a plurality of first RF signals to form a beam, wherein the second RF signal is based on the beam.

14. The communication system of claim 11, wherein the first device further includes a plurality of switches connected between the transmitter and a plurality of first antennas,
wherein the controller is configured to control the plurality of switches to sequentially transmit a plurality of first RF signals to the plurality of first antennas,
wherein the receiver is configured to generate a plurality of baseband signals based on the plurality of first RF signals output from the plurality of first antennas, and
wherein the feedback generator is configured to generate the feedback signal based on the plurality of baseband signals.

15. A communication device, comprising:
a pre-distorter configured to generate a first baseband signal;
a transmitter configured to generate a plurality of first radio frequency (RF) signals from the first baseband signal;
a plurality of first antennas configured to output the plurality of first RF signals;
a second antenna configured to receive the first RF signals and output a second RF signal corresponding to each of the plurality of first RF signals;
a receiver configured to generate a feedback signal by taking an average of the second RF signals;
a controller configured to receive the feedback signal and estimate distortions of the transmitter based on the feedback signal; and
a plurality of switches, wherein the controller is configured to control the plurality of switches to transmit the plurality of first RF signals to the plurality of first antennas.

16. The communication device of claim 15, wherein the controller provides a set signal to the pre-distorter indicative of the estimated distortion of the transmitter, and the pre-distorter generates a second baseband signal based on the set signal.

17. The communication device of claim 16, wherein the second baseband signal is provided to the transmitter, and the transmitter generates a third RF signal from the second baseband signal.

18. The communication device of claim 15, wherein the second RF signal is based on a beam formed by the plurality of first RF signals, the transmitter includes a plurality of phase shifters, and the controller is configured to control the plurality of phase shifters to direct a beam toward the second antenna.

* * * * *